United States Patent
Frame et al.

(10) Patent No.: US 7,535,504 B2
(45) Date of Patent: May 19, 2009

(54) ONE CHIP CAMERA WITH COLOR SENSING CAPABILITY AND HIGH LIMITING RESOLUTION

(75) Inventors: Wayne W. Frame, Cedaredge, CO (US); Gerald B. Heim, Lafayette, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 634 days.

(21) Appl. No.: 11/299,047

(22) Filed: Dec. 9, 2005

(65) Prior Publication Data

US 2006/0088298 A1    Apr. 27, 2006

Related U.S. Application Data

(63) Continuation-in-part of application No. 10/142,320, filed on May 8, 2002, now Pat. No. 7,012,643.

(51) Int. Cl.
     H04N 3/14    (2006.01)
(52) U.S. Cl. ........................................ 348/272; 348/273
(58) Field of Classification Search ................. 348/272, 348/273–280
See application file for complete search history.

(56) References Cited

U.S. PATENT DOCUMENTS

| | | | | |
|---|---|---|---|---|
| 3,576,392 | A | 4/1971 | Hofstein | 348/331 |
| 3,604,842 | A | 9/1971 | Harwood | 348/647 |
| 3,971,065 | A | 7/1976 | Bayer | 358/41 |
| 4,339,771 | A | 7/1982 | Morishita et al. | 358/41 |
| 4,667,226 | A | 5/1987 | Glenn | 348/344 |
| 4,700,220 | A | 10/1987 | Yasuda et al. | 358/44 |
| 4,709,259 | A | 11/1987 | Suzuki | 348/280 |
| 4,758,883 | A | 7/1988 | Kawahara et al. | 358/44 |
| 4,903,122 | A | 2/1990 | Ozaki et al. | 358/48 |
| 4,967,276 | A | 10/1990 | Murakami et al. | 348/164 |
| 5,107,333 | A | 4/1992 | Poque et al. | |

(Continued)

FOREIGN PATENT DOCUMENTS

JP      58-020091      5/1983

(Continued)

OTHER PUBLICATIONS

European Examination Report for EP Patent Application No. 03 731 150.3, dated Nov. 15, 2007, 5 pages.

(Continued)

*Primary Examiner*—Nhan T Tran
*Assistant Examiner*—Mekonnen Dagnew
(74) *Attorney, Agent, or Firm*—Sheridan Ross P.C.

(57) ABSTRACT

A high sensitivity, single chip, low light level imaging device is provided. The imaging device of the present invention utilizes sparse color sampling, to maximize the luminance information gathered. In particular, color information is gathered by a small proportion of the pixels included in an image sensor, while the remaining pixels operate at full spectrum sensitivity. The present invention allows the correct hue of objects to be determined, while providing high sensitivity to available luminance information in a scene. The imaging device can include a global near infrared blocking filter that can be selectively placed in the optical path of the device. In addition or alternatively, opaque pixels may be included in the image sensor to correct for errors caused by charge diffusion.

23 Claims, 15 Drawing Sheets

U.S. PATENT DOCUMENTS

| | | | | |
|---|---|---|---|---|
| 5,172,220 | A | 12/1992 | Beis | 348/262 |
| 5,251,019 | A | 10/1993 | Moorman et al. | 348/273 |
| 5,267,028 | A | 11/1993 | Suga et al. | 358/44 |
| 5,278,660 | A | 1/1994 | Sugiki | 358/213.22 |
| 5,852,468 | A | 12/1998 | Okada | 348/272 |
| 5,874,994 | A | 2/1999 | Xie et al. | 348/349 |
| 6,091,451 | A | 7/2000 | Farr et al. | 348/342 |
| 6,150,930 | A * | 11/2000 | Cooper | 340/435 |
| 6,163,342 | A * | 12/2000 | Suzuki | 348/364 |
| 6,181,376 | B1 | 1/2001 | Rashkovskiy et al. | 348/273 |
| 6,188,433 | B1 | 2/2001 | Orbock | 348/297 |
| 6,211,521 | B1 | 4/2001 | Bawolek et al. | 250/339.02 |
| 6,215,597 | B1 | 4/2001 | Duncan et al. | 359/637 |
| 6,292,212 | B1 | 9/2001 | Zigadlo et al. | 348/33 |
| 6,456,793 | B1 | 9/2002 | Ray et al. | 396/89 |
| 6,486,974 | B1 | 11/2002 | Nakai et al. | 358/1.9 |
| 6,759,646 | B1 | 7/2004 | Acharya et al. | 250/226 |
| 2002/0063789 | A1 | 5/2002 | Acharya et al. | 348/273 |
| 2002/0067413 | A1 | 6/2002 | McNamara | 348/216 |
| 2002/0118861 | A1 | 8/2002 | Jouppi et al. | 382/103 |
| 2004/0174446 | A1 | 9/2004 | Acharya | 348/279 |

FOREIGN PATENT DOCUMENTS

| | | |
|---|---|---|
| JP | 58219889 | 12/1983 |
| JP | 59086982 | 5/1984 |
| JP | 63062492 | 3/1988 |
| JP | 2001-69519 | 3/2001 |
| WO | WO-86/01678 | 3/1986 |
| WO | WO-00/57651 | 9/2000 |

OTHER PUBLICATIONS

European Search Report for EP Patent Application No. 03 731 150.3, dated Oct. 3, 2006, 4 pages.

Official Action for Japanese Patent Application No. 2004-504506, mailed Aug. 26, 2008 (English translation included).

European Search Report (Ref No.: JR/P10215EP-W) for PCT/US03/14802.

Examiner Ward, International Search Report for PCT/US03/14802 dated Nov. 25, 2003, pp. 1-5.

* cited by examiner

*Fig. 7A*
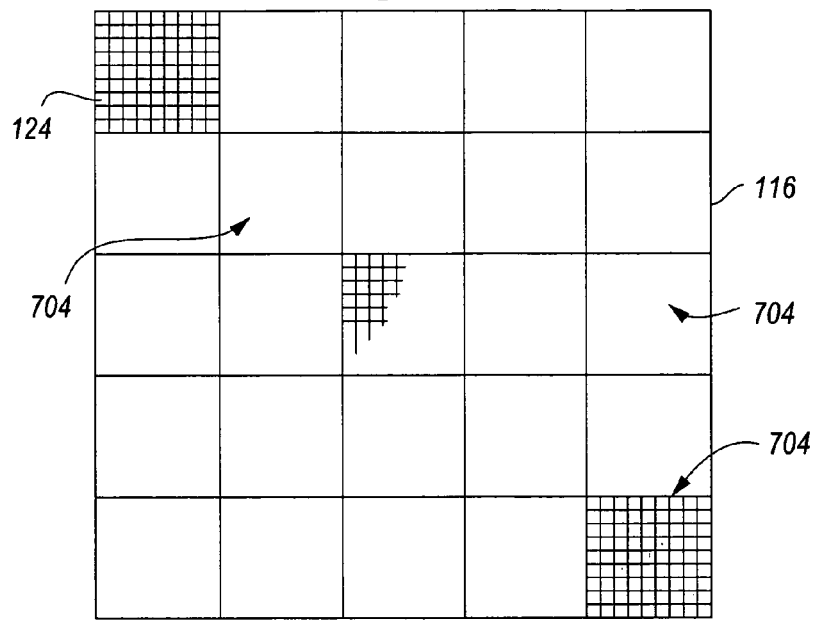
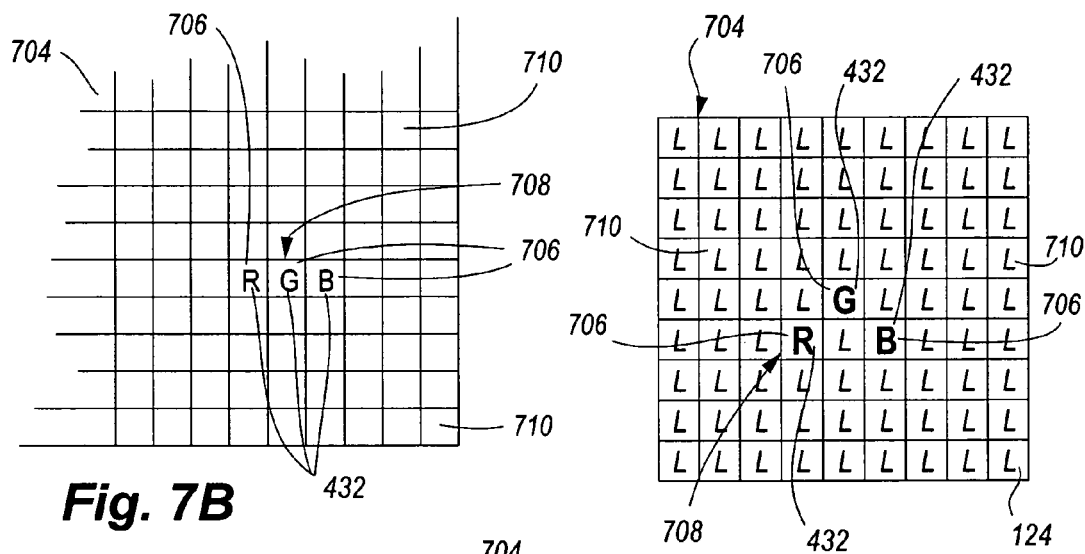
*Fig. 7B*
*Fig. 7C*
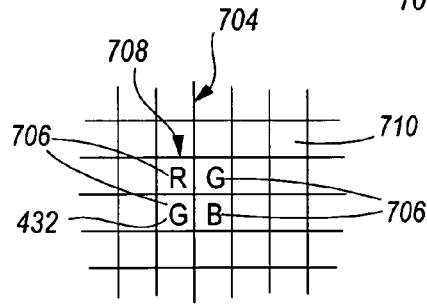
*Fig. 7D*

ONE CHIP CAMERA WITH COLOR SENSING CAPABILITY AND HIGH LIMITING RESOLUTION

CROSS REFERENCE TO RELATED APPLICATIONS

This application is a Continuation-In-Part of U.S. patent application Ser. No. 10/142,320, filed May 8, 2002 now U.S. Pat. No. 7,012,643, the entire disclosure of which is hereby incorporated herein by reference.

FIELD OF THE INVENTION

The present invention relates to one chip low light level imaging devices. In particular, the present invention relates to electronic imaging devices that include a number of pixels, the majority of which are capable of sensing light at wavelengths extending into the near infrared.

BACKGROUND OF THE INVENTION

Low light level imaging devices are useful in a wide variety of applications. For example, low light level imaging devices are useful in nighttime surveillance activities. In low light level conditions, it is important for sensors to take advantage of every available photon. Approaches to providing human perceptible images in low light conditions have included the use of image intensifiers. Other approaches to providing images in low light conditions have utilized the detection of light having wavelengths outside of the visible spectrum. Although such approaches have had success in providing human perceptible images of scenes that could not otherwise be viewed by the human eye, such approaches have been unable to provide chrominance information in combination with high sensitivity at low light levels.

Image intensifiers are generally formed using microchannel plates. In particular, a photocathode is positioned near a honeycomb of small channels (or microchannels) upon which a voltage gradient is imposed. When a photon collides with the photocathode, an electron is released and is accelerated along a channel. The electron is focused on a phosphorous screen, which produces photons in response to being bombarded by the electrons ejected by the microchannel. The resulting image on the phosphorous screen may be viewed directly, or may be converted into digital information by a imaging device, such as a charge coupled device (CCD).

The amplification of light provided by an image intensifier is effective in providing views of scenes at low light levels. However, the use of a phosphorous screen results in a monochromatic image. In addition, the limited resolution of the microchannel element in turn limits the image resolution available at the phosphorous screen. Also, a "halo" effect can occur when electrons bounce off the mouth of a channel and hit a neighbor channel. Furthermore, image intensifiers require a relatively high voltage for operation, and have a finite life span.

Another approach to providing high sensitivity imaging devices in low light conditions is to utilize image sensors that are capable of detecting light falling outside of the normal range of human vision. For example, typical nighttime scenes are relatively rich in infrared light wavelengths. Therefore, by detecting infrared wavelengths and providing the detected infrared information as luminance (or brightness) information to a human perceptible display, high sensitivity may be obtained. However, systems utilizing imagers that are sensitive to infrared wavelengths do not provide information regarding the colors of objects present in the imaged scene.

As a further alternative, imaging devices or cameras utilizing three image sensors or chips for detecting color information, and a fourth chip for detecting luminance information have been proposed. However, multichip designs are difficult to manufacture and implement. In addition, the ability of such designs to provide high sensitivity is compromised, by splitting the light gathered by the device's lens system among four different imagers. Furthermore, the use of four separate image sensors results in an overall package that is relatively large and expensive to produce.

In consumer and military applications, it is desirable to provide imaging devices that are relatively small and light, and that use relatively little power. Accordingly, most consumer imaging devices and many imaging devices designed for military applications utilize a single image sensor. As a result, existing imaging devices that provide color information are relatively insensitive in low light conditions, while imaging devices optimized for high sensitivity and low light conditions typically provide a monochromatic image.

The visual tasks of detection and recognition can be greatly aided if color information is provided to the viewer. Imaging devices capable of providing color information typically do so by separately sampling light having bands of color centered on the red, green, and blue portions of the spectrum. However, because filtering light requires the rejection of at least some components of the light incident on the filter, filtering reduces the sensitivity that might otherwise be available from an imaging device. One approach to a one-chip color camera is described by Bayer in U.S. Pat. No. 3,971,065. The filter, known as a Bayer filter, disclosed therein establishes pixel subsets distributed across the entire array of pixels in an image sensor. Each subset of pixels consists of one pixel having a filter that admits red light, one pixel having a filter that admits blue light, and two pixels having filters that admit green light. The Bayer filter favors green filter elements because green is the main contributor to the luminance information in a scene. This preference for luminance (or brightness) information over chrominance information provides an image sensor with greater sensitivity and resolution. However, because at least some filtering is performed before photons reach the pixels of the image sensor, the sensitivity of devices employing Bayer filtration could be improved. In addition, color cameras typically use a global near infrared blocking filter placed before the focal plane in the optical path in order to eliminate the near infrared spectral component from the image information. This is done to achieve good color performance at the expense of sensitivity. Accordingly, conventional color cameras typically have poor low light performance.

It would be desirable to provide an electronic color imaging device that is capable of providing high sensitivity. In addition, it would be advantageous to provide such a device that utilized a single image sensor. Furthermore, it would be desirable to provide such a device that was relatively inexpensive to implement and easy to manufacture.

SUMMARY OF THE INVENTION

In accordance with the present invention, a one chip, low light level imaging device, including a color camera, is provided. In accordance with an embodiment of the present invention, more than half of the pixels comprising the device's image sensor receive light that is not filtered to within a subset of the visible wavelengths. Instead, those pixels are capable of sensing wavelengths across the full spectral responsivity of the image sensor or imaging array. Accordingly, these pixels are incapable of discriminating between colors, or providing information for discriminating between colors, and are instead panchromatic. Furthermore, less than half of the pixels of the image sensor receive light filtered to within a subset of the visible wavelengths, to provide color information to the user. In accordance with an embodiment of the present invention, the panchromatic pixels of the image sensor are sensitive to light having wavelengths extending across the visible spectrum and into the near infrared and infrared wavelengths.

In accordance with an embodiment of the present invention, the number of pixels receiving filtered light to provide color information is small, as compared to the number of pixels receiving light that is not so filtered. For example, in accordance with an embodiment of the present invention, about twelve percent or less of the pixels of the image sensor are capable of providing color information. In accordance with another embodiment of the present invention, less than about four percent of the pixels of the image sensor are capable of providing color information.

In accordance with another embodiment of the present invention, color information obtained by pixels receiving filtered light is assigned to pixels receiving unfiltered light through interpolation. In accordance with still another embodiment of the present invention, color information is associated with pixels receiving unfiltered light by convoluting the signals obtained by pixels receiving filtered light with a suitable kernel. Other embodiments of the present invention assign color information to areas of an image corresponding to pixels that do not themselves provide color information by averaging the color signals from nearby color sensitive pixels.

In accordance with still another embodiment of the present invention, the pixels receiving light that is filtered to within a subset of the visible wavelengths are distributed among the panchromatic pixels of the image sensor. For example, the image sensor may be considered as a plurality of pixel subsets. Each pixel subset comprises a group of pixels having n rows and m columns. Within each subset, a group of pixels is provided with light filtered to allow these pixels to provide color information. For example, a first pixel may be provided with red light, a second with green light, and a third with blue light. As a further example, a first and a second of the pixels may be provided with green light, a third with red light, and a fourth with blue light. The color value sensed by the pixels receiving filtered light may then be assigned to all of the pixels included in the subset of pixels. Alternatively, the color sensed by a number of color groups, may be averaged and assigned to areas of an image within a perimeter or area defined by the number of color groups that correspond to panchromatic pixels. In accordance with an embodiment of the present invention, the pixels receiving filtered light are positioned at or near the center of the subset of pixels. In accordance with a further embodiment of the present invention, the subsets of pixels are arranged about the image sensor in a staggered configuration, to reduce aliasing of color features in an observed scene. In another embodiment of the present invention, pixels receiving filtered information are distributed randomly or pseudo-randomly about the image sensor.

In accordance with the present invention, a method for providing a color image in low light environments is provided. In accordance with an embodiment of the present invention, the light provided to a small proportion of pixels included as part of an image sensor is filtered to obtain a color signal. The color signal thus obtained is assigned to areas of the image corresponding to pixels that receive unfiltered image information.

In accordance with embodiments to the present invention, improved color performance is achieved by filtering out wavelengths in the near infrared region. More particularly, embodiments of the present invention provide a global near infrared blocking filter that removes wavelengths in the near infrared region from image information provided to the pixels of the image sensor. Furthermore, because the image sensor in such embodiments utilizes sparse color sampling as described herein, high resolution is achieved. More particularly, because the majority of the image sensor pixels are panchromatic rather than responsive only to a relatively narrow segment of the spectrum in order to provide color information, high spatial frequencies are resolved. In addition, embodiments of the present invention utilizing a global near infrared blocking filter are capable of providing high sensitivity for low light operation by removing the near infrared blocking filter from the optical path. In addition, embodiments of the present invention allow the chrominance channels (i.e. the signals from the color sensitive pixels) to be switched off during low light or extremely low light operation, in order to reduce or limit the introduction of noise to the output signal. Therefore, embodiments of the present invention are capable of providing a high resolution signal in both day and night operation, with the ability to improve color saturation by using a near infrared blocking filter during daylight operation, and high sensitivity during low light operation by removing the near infrared blocking filter. Furthermore, in extremely low light operation, signals from color sensitive pixels can be switched off, to reduce noise.

In accordance with embodiments of the present invention, reductions in the effects of charge diffusion are achieved by including pixels in the image sensor that are effectively opaque. More particularly, pixels that are effectively opaque to both the visible and near infrared region of the spectrum are provided. The opaque pixels may comprise pixels that are each associated with a filter having a light attenuation of 80× or greater. The opaque pixels may be provided by creating a filter associated with the pixels that are to operate as opaque pixels. The opaque pixels may be associated with groups of color information pixels. The signal from each opaque pixel is subtracted from the color information signals provided by the color information pixels grouped with the opaque pixel to mitigate the effect of charge diffusion from neighboring pixels.

The provision of an image sensor having a large proportion of panchromatic pixels and a relatively small proportion of color sensitive pixels provides a sensor with a high spatial sensing frequency for high resolution, and high sensitivity. Furthermore, signals from the panchromatic pixels are only used for luminance or brightness assessment, while the signals from the color information pixels are used to assign color to areas of the image corresponding to panchromatic pixels. Therefore, the resulting image provides color information having the correct or a nearly correct hue, although the saturation of the color will typically be in error. In addition to the ability to provide a higher resolution for a given pixel size than a color camera having all color information pixels or a high proportion of color information pixels, embodiments of the present invention provide good low light sensitively by including panchromatic pixels with sensitivity that extends into at least the near infrared region, at least while a global infrared blocking filter that may be provided is removed from the optical path.

Additional features and advantages of the present invention will become more readily apparent from the following description, particularly when taken together with the accompanying drawings.

BRIEF DESCRIPTION OF THE DRAWINGS

FIG. 7A depicts an image sensor in accordance with an embodiment of the present invention;

FIG. 7B depicts a subset of pixels in accordance with an embodiment of the present invention;

FIG. 7C depicts a subset of pixels in accordance with another embodiment of the present invention;

FIG. 7D depicts a subset of pixels in accordance with another embodiment of the present invention;

DETAILED DESCRIPTION

According to the present invention, a one chip, low light level color imaging device or camera is provided.

Figure 1:
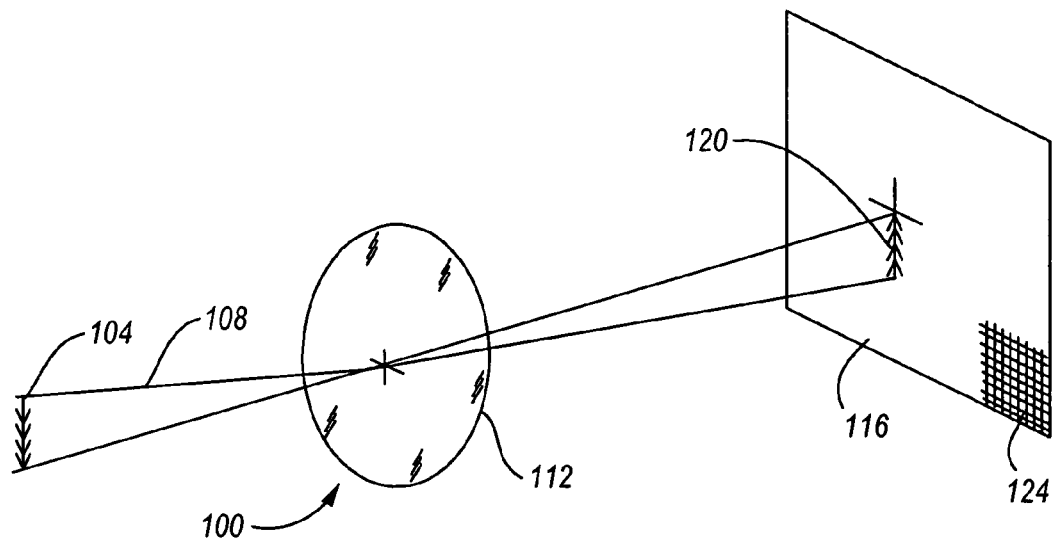
FIG. 1 illustrates an electronic imaging device configuration.

In FIG. 1, a digital imaging device 100 configuration suitable for use in connection with the present invention is illustrated. As shown in FIG. 1, an object 104 reflects light 108 that is focused by a lens or lens system 112 onto an image sensor 116 as an image object 120. The image sensor 116 is comprised of a plurality of photosensitive elements or pixels 124. The pixels 124 are distributed over the surface of the image sensor 116 in a two-dimensional array. The pixels 124 generally convert the light focused onto the surface of the image sensor 116 by the lens 112 (i.e. the image object 120) into electronic signals.

In a conventional color imaging device, each of the pixels 124 of the image sensor 116 receive light within one of three overlapping frequency bands. The relative intensity of the light received by individual pixels 124 included in a group of pixels in which each of the different frequency bands are represented enables the image sensor 116 to provide color information. Furthermore, the image information received by pixels 124 that are particularly sensitive to luminance information (i.e., pixels receiving green light) allows the image sensor 116 to provide a signal corresponding to details of the image object 120. As will be explained in detail below, an imaging device 100 in accordance with the present invention allows a larger proportion of the pixels 124 to contribute luminance information than a conventional device, increasing the sensitivity of the device, while continuing to provide color information.

Figure 2:
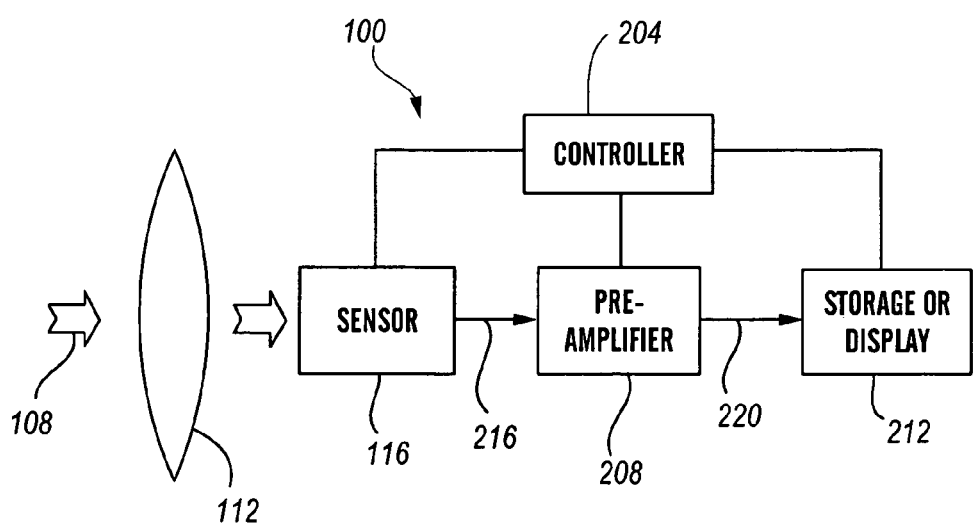
FIG. 2 is a block diagram depicting major components of an electronic imaging device.

With reference now to FIG. 2, a block diagram depicting the major functional components of an imaging device 100 are illustrated. As noted above in connection with FIG. 1, a digital imaging device or camera 100 typically includes a system for focusing light reflected by images onto the image sensor 116 in the form of a lens or lens system 112. In addition to the lens or lens system 112 and the image sensor 116 as shown in FIG. 2, a digital image device 100, including a digital imaging device or camera 100, in accordance with the present invention, may include a controller 204, a preamplifier 208, and a storage and/or display device 212. In general, the controller 204 controls the operation of the electronic components (e.g., the image sensor 116, preamplifier 208 and storage and/or display 212) included in the device 100. With respect to the image sensor 116, the controller 204 controls the frame rate at which image information is converted into electronic form by the image sensor 116. The electronic information regarding the image object 120 produced by the image sensor 116 is provided to the preamplifier 208 for amplification. The controller 204 may control the amount of gain imparted by the preamplifier 208 to the electronic image signal 216 received by the preamplifier 208. The amplified image signal 220 may then be provided to the storage device and/or display device 212. The image information stored or displayed by a storage device and/or display device 212, in accordance with the present invention, includes information calculated by the controller 204. Such information includes color information related to pixels. In particular, the controller 204 is capable of determining color information related to areas of the image sensor 116 with respect to which color information is not provided as part of the electronic image signal 216. The function of the controller 204 in determining this color information will be described in greater detail below.

Figure 3:
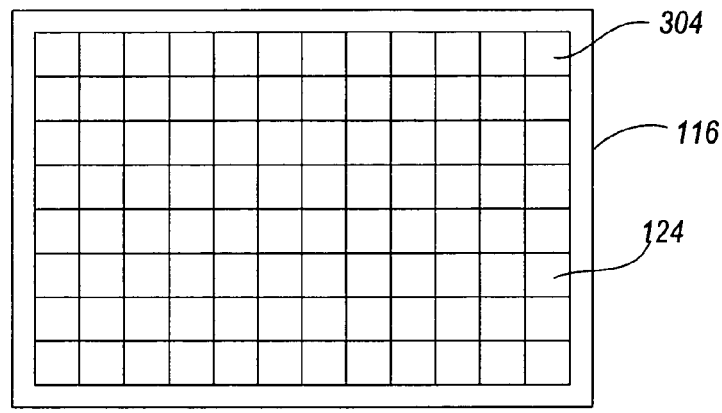
FIG. 3 depicts the imaging surface of an image sensor.

With reference now to FIG. 3, the imaging surface 304 of an image sensor 116 in accordance with an embodiment of the present invention is illustrated. As shown in FIG. 3, the pixels 124 comprising the imaging surface 304 of the image sensor 116 are distributed across the imaging surface 304 in rows and columns. However, it should be appreciated that other arrangements of pixels 124 may be utilized. For example, the position of pixels in a first row may be staggered from the position of pixels in a second row to create a pattern that does not result in the pixels being arranged in continuous columns.

Figure 4:
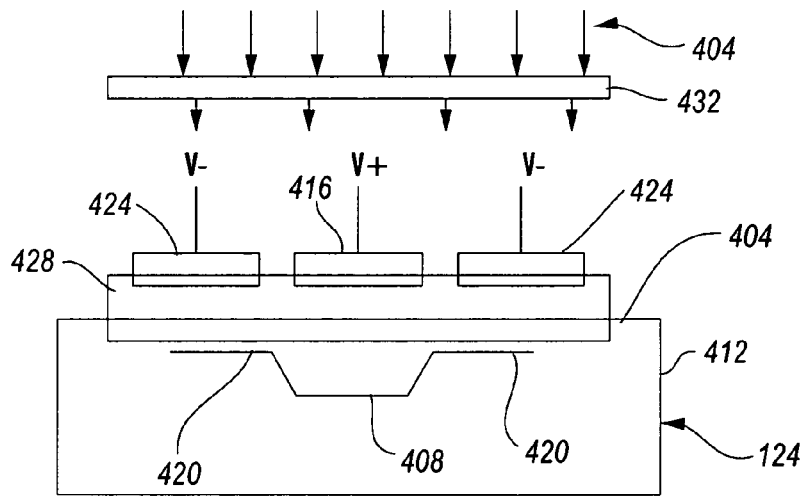
FIG. 4 depicts a pixel of an image sensor.

With reference now to FIG. 4, a cross-section of an individual pixel 124 is depicted. The pixel 124 shown in FIG. 4 is a charge coupled device. A charge coupled device type pixel 124 converts light 404 incident on the active surface of the pixel 124 into an electronic charge. This electronic charge is collected in a potential well 408 that is established by applying a voltage to the silicone substrate 412 through a gate electrode 416 to which a positive voltage is applied. The electrons are confined in the well 408 during the exposure period by a potential barrier 420 created by applying negative voltages to barrier electrodes 424. In a typical device, the electrodes 416, 424 are insulated from the substrate 412 by a layer of silicone dioxide 428.

Also illustrated in FIG. 4 is a filter element or microfilter 432. A filter element 432 is associated with selected pixels 124 to allow the image sensor 116 to provide color information. The filter element 432 generally functions to allow one of three spectral regions (i.e. colors) to pass through to the pixel 124. The filter elements 432 used in connection with embodiments of the present invention may comprise organic dye filters. In accordance with other embodiments of the present invention, the filter elements may comprise multilayer interference filters. The filter elements 432 may be applied directly to the image sensor 116 surface, or they may be applied on glass or another substrate and bonded to the image sensor 116.

After the desired period of exposure has elapsed, the barrier 420 is lowered, and the collected charge is transferred to a serial register. In general, charge collected by rows of pixels 124 are shifted into the serial register. Alternatively, an entire array of pixels 124 may be shifted into an identically sized storage array during readout of the image.

Figure 5:
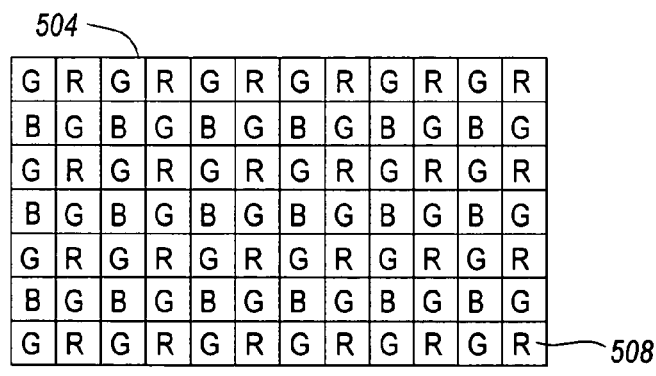
FIG. 5 depicts a filter in accordance with the prior art.

In FIG. 5, a filter 504 for providing color information in connection with an image sensor 116 in accordance with the prior art is illustrated. In general, the filter 504 includes a plurality of microfilter elements 508. In general, a single filter element 508 is provided for each pixel 124 (see FIG. 3) of the image sensor 116. Accordingly, each pixel 124 receives light within a selected frequency band. According to alternative methods for providing color information, a filter 504 may operate in sequence to provide a first color to the pixels 124 (e.g., green) and the information provided while that first frequency band is in effect read out. Next, the filter 504 may provide filtered light within a second frequency band (e.g., red), and the information obtained during operation of the filter mode providing the second frequency band read from the pixels 124. Finally, a third filter mode may be entered by the filter 504 to provide the pixels 124 with a third frequency band (e.g., blue). Under either scheme, it can be appreciated that the pixels 124 of the image sensor 116 always receive filtered light information in a color camera in accordance with the prior art. Therefore, during operation of such a camera, some available photons are removed from the light that might otherwise be available to the pixels comprising the image sensor 116.

Figure 6:
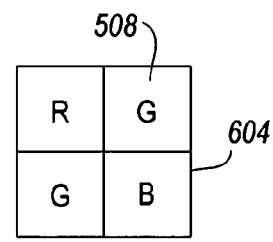
FIG. 6 depicts a filter element in accordance with the prior art.

The filter scheme illustrated in FIG. 5 utilizes subgroups of pixels 124. Such a subgroup 604 is generally illustrated in FIG. 6. From FIG. 6, it is apparent that each subgroup 604 contains four filter elements 508. One filter element allows red light to pass, and another filter element 508 allows blue light to pass. In addition, two filter elements 508 allow green light to pass. Because of the importance of green light in providing luminance information, and because color information can be adequately conveyed using a relatively small portion of the available bandwidth, the use of two green filter elements 508 per subgroup 604 tends to improve the sensitivity of the image sensor 116, while maintaining a relatively large amount of color information.

The sensitivity of an image sensor 116 in accordance with embodiments to the present invention in low light applications is improved as compared to convention sensors by reducing the number of pixels 124 receiving light filtered in order to allow those pixels to sense color, thereby making more of the photons reflected from images in a scene available to more of the pixels 124. Furthermore, embodiments of the present invention provide adequate color information for aiding in object recognition by providing filtered light to a small proportion of pixels 124 of an image sensor 116.

With reference now to FIG. 7A, an arrangement of pixels 124 across the imaging surface of an image sensor 116 in accordance with an embodiment of the present invention is depicted. In general, the pixels 124 are arranged in a plurality of subsets 704. For purposes of clarity, it should be appreciated that only some of the pixels 124 of the imaging sensor 116 are depicted in FIG. 7.

With reference now to FIG. 7B, a subset of pixels 704 is illustrated. As shown in FIG. 7B, color information pixels 706 forming a group of color information pixels 708 is associated with color filters or color filter elements 432. Alternatively, pixels 124 that are responsive to light confined to select frequency bands (i.e. colors) may comprise the group of color information pixels 708. In the example of FIG. 7B, the group of pixels 708 consists of three pixels, one of which receives light passing through a red filter 432, another that receives light passing through a green filter 432, and a third that receives light passing through a blue filter 432. Furthermore, it should be appreciated that the majority of pixels 124 included in the subset of pixels 704 do not receive light that has been filtered in order to allow color information in an imaged scene to be sensed. The pixels 124 that do not provide a signal that permits color discrimination are referred to herein as panchromatic pixels 710. For instance, in the example subset of pixels 704 illustrated in FIG. 7B, there are 81 pixels, 78 of which are panchromatic pixels 710, and 3 of which (or less than 4%) receive filtered light. Accordingly, the majority of pixels 124 in the subset of pixels 704 are provided with light that is not filtered to permit color discrimination. In this example then, 96% of the pixels 124 in the subset of pixels 704 are panchromatic pixels 710 that are sensitive to light of full spectral distribution, with the result that the sensitivity of the imaging device 100 is minimally impacted by the group of color information pixels 708.

In accordance with an embodiment of the present invention, the panchromatic pixels 710 are sensitive to light having wavelengths from about 400 nm to about 1050 nm. In accordance with a further embodiment of the present invention, the color information pixel included in the group of the pixels 708 receiving red filtered light is provided with light having a wavelength from about 540 nm to about 780 nm, the pixel receiving green filtered light is provided with light having a wavelength from about 470 nm to about 610 nm, and the pixel receiving blue filtered light is provided with light having a wavelength from about 380 nm to about 510 nm.

In FIG. 7C, a subset of pixels 704 having a group 708 of color information pixels 706 in accordance with another embodiment of the present invention is illustrated. The subset of pixels 704 in FIG. 7C are arranged in a 9×9 array of pixels 124, with each of the color information pixels having an associated color filter element 432. Alternatively, pixels 124 that are responsive to light confined to select frequency bands may comprise the group of color information pixels 708. In the example of FIG. 7C, the group of pixels 708 consists of one pixel 124 that is responsive to red light, a second pixel 124 that is responsive to green light, and a third pixel 124 that is responsive to blue light. Furthermore, the pixels receiving color information 706 are located diagonally from their neighbor color information pixel 706. As in the example subset of pixels 704 of FIG. 7B, the majority of the pixels in the subset of pixels 704 of FIG. 7C are panchromatic pixels 710 that receive light that has not been color filtered. Accordingly, the majority of the pixels 124 provide unfiltered or full spectrum, luminance information, for high sensitivity. In the embodiment shown in FIG. 7C, less than 4% of the pixels 124 in the subset of pixels 704 receive filtered light.

With reference now to FIG. 7D, a group of color information pixels 708 included in a subset of pixels 704 in accordance with another embodiment of the present invention is illustrated. The group of color information pixels 708 illustrated in FIG. 7D differs from the group of color information pixels 708 illustrated in FIGS. 7B and 7C in that the group of color information pixels 708 illustrated in FIG. 7D implements a Bayer filter. Color information regarding the imaged object 120 is obtained only from those pixels 706 that are included in a group of color information pixels 708. Therefore, the group of color information pixels 708 receiving light filtered to within selected frequency bands represents a small proportion (i.e. less than half) of the total pixels 124 within a subset of pixels 704. The remainder of the pixels 124 provides luminance information. This arrangement provides high sensitivity, by limiting the number of pixels 124 receiving filtered light as compared to prior art systems.

As can be appreciated, a group of color information pixels 708 preferably includes at least one pixel 124 sensitive to green light, at least one pixel 124 sensitive to red light, and at least one pixel 124 sensitive to blue light. As can further be appreciated, it is generally desirable to group the individual pixels 124 of a group of color information pixels 708 in close proximity to one another. However, the particular spacing and geometric relationship of the pixels 124 in a group of color information pixels 708 may be varied.

With the addition of a switch in the controller 204 or other processing electronics associated with the imaging device 100, the chrominance signals red, green and blue can be turned off and the system will perform almost identically to that of a monochrome camera having no color filtering. Such a switch can serve to provide color information to the displayed image only when color discrimination is desired or merited. A switch capable of disabling the chrominance signals can also be used to reduce noise. For example, when light levels are very low and signal gain for the chrominance signal is high, the noise associated with the high gain levels can be removed by turning off the signals from the color information pixels 708. When the chrominance signal is turned off, luminance information for the affected pixels can continue to be supplied by neighboring pixels 124 receiving a full spectral distribution.

Although the description set forth herein contains examples of color information pixels 706 comprising additive color schemes, such as RGB color schemes, it should be appreciated that the present invention may also utilize a complementary color scheme. For example, the color information pixels 706 comprising groups of color information pixels 708 may comprise a subtractive color scheme, such as Cyan Magenta Yellow (CMY). A subset of pixels 704 utilizing a subtractive color scheme may include a group of color information pixels 708 in which at least one pixel 124 is sensitive to cyan light, at least one pixel 124 is sensitive to magenta light, and at least one pixel 124 is sensitive to yellow light. The remaining pixels 124, which comprise the majority of the pixels included in the subset of pixels 704, are panchromatic pixels 710 that provide luminance information.

Figure 8:
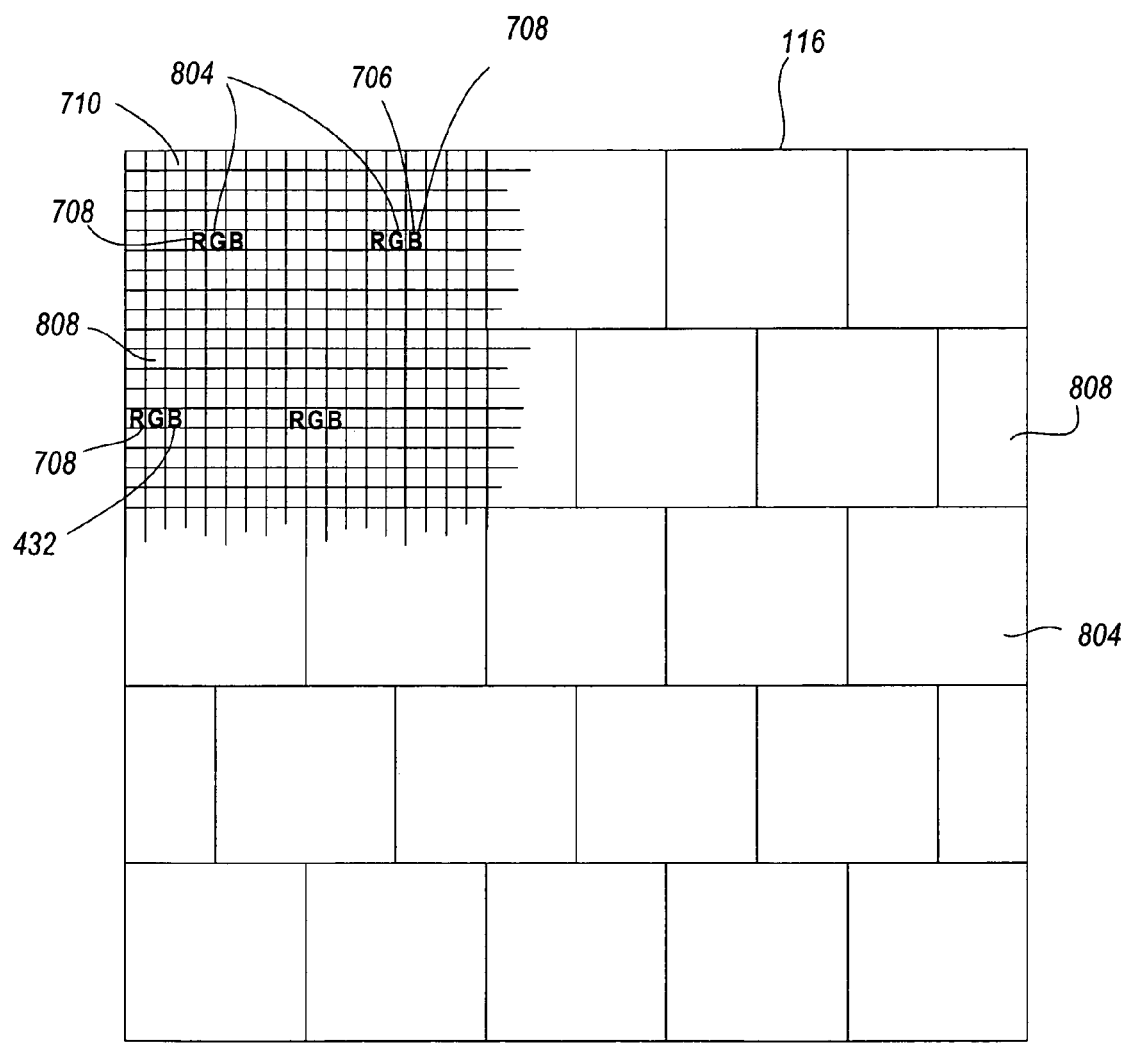
FIG. 8 depicts an image sensor in accordance with another embodiment of the present invention.

In FIG. 8, an alternative arrangement of pixel subsets is depicted. In particular, the image sensor 116 illustrated in FIG. 8 comprises square pixel subsets 804, and rectangular pixel subsets 808. The rectangular pixel subsets 808 are the result of staggering the subsets of pixels 804 with respect to one another, so that continuous columns of pixel subsets 804 are not formed. The subsets of pixels 804, 808 each contain groups of pixels 708 that receive color filtered light. The groups of pixels 708 represent a small proportion (i.e. less than half) of the total number of pixels 124 available within a subset of pixels 804, 808. By staggering the subsets of pixels 804, 808, the color information obtained by the groups of pixels 708 can reduce the aliasing that can occur as a result of the relatively sparse color information obtained by an image sensor 116 in accordance with the present invention.

Figure 9:
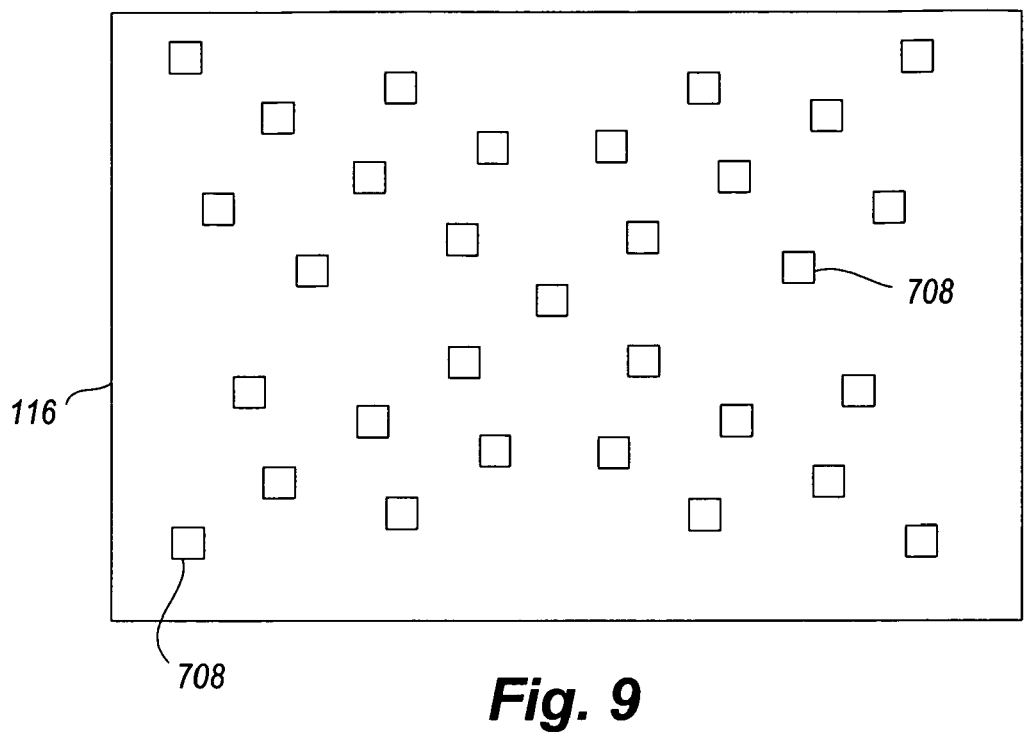
FIG. 9 depicts an image sensor in accordance with another embodiment of the present invention.

With reference now to FIG. 9, the surface of an image sensor 116 in accordance with yet another embodiment of the present invention is illustrated. In FIG. 9, groups of color information pixels 708 comprising one pixel provided with red filtered light, one pixel provided with green filtered light, and one pixel provided with blue filtered light are distributed about diagonal lines across the surface of the image sensor 116. This arrangement can also reduce the effects of the aliasing of color information.

Figure 10:
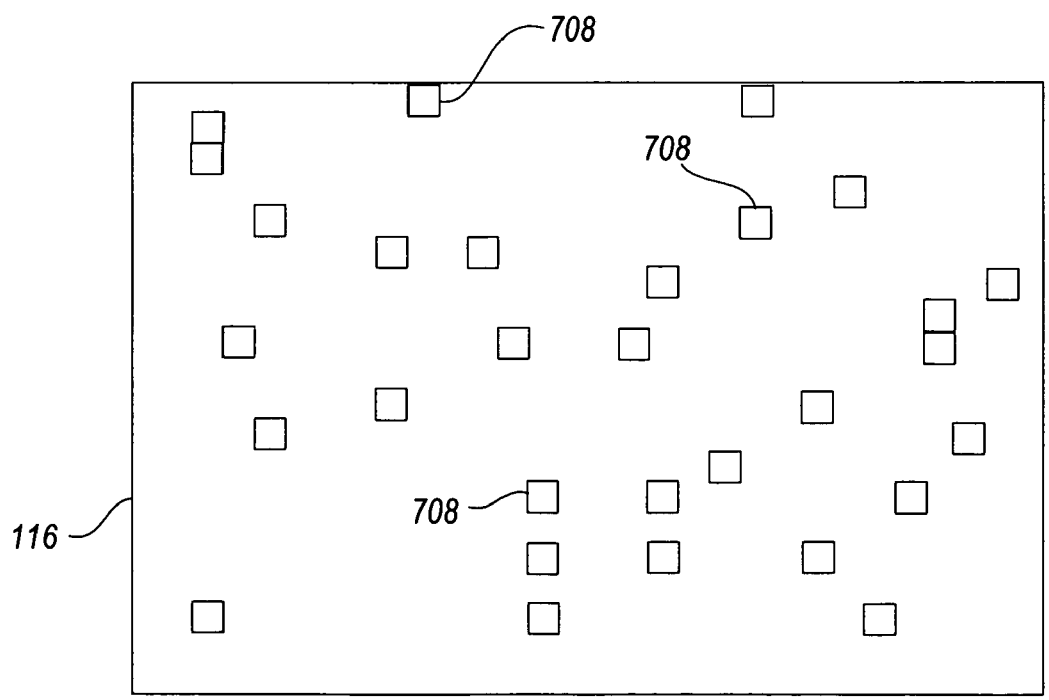
FIG. 10 depicts an image sensor in accordance with another embodiment of the present invention.

With reference now to FIG. 10, still another image sensor 116 in accordance with an embodiment of the present invention is illustrated. In FIG. 10, groups of color information pixels 708 receiving color filtered light are arranged about the surface of the image sensor 116 randomly. In accordance with an alternative embodiment of the present invention, the groups of color information pixels are distributed pseudo-randomly about the surface of the image sensor 116. In general, the distribution of groups of color information pixels 708 in horizontal and vertical lines should be minimized to minimize aliasing of the dominant horizontal and vertical lines found in most objects. In accordance with an embodiment of the present invention, less than 12% of the pixels 124 of the image sensor 116 receive color filtered light. In accordance with a further embodiment of the present invention, less than 5% of the pixels 124 of the image sensor 116 receive color filtered light.

Figure 11:
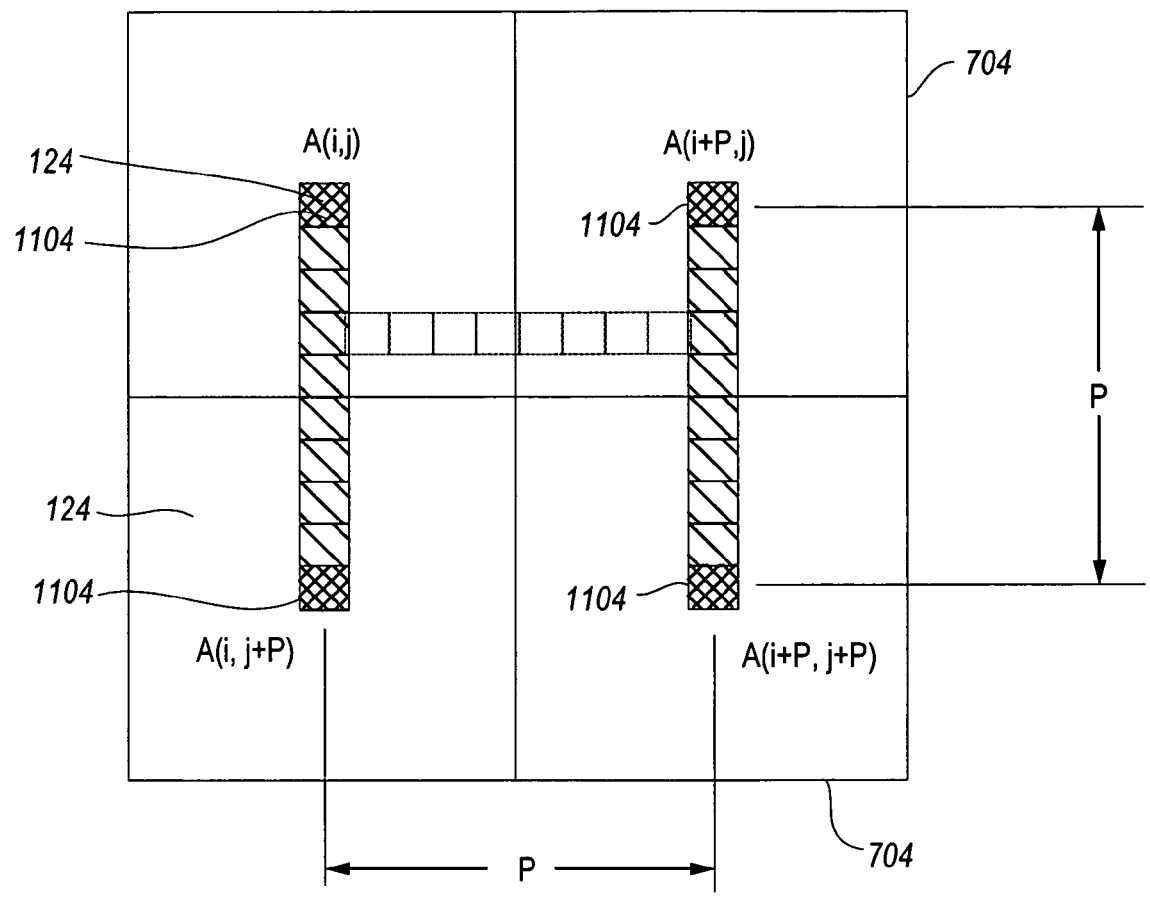
FIG. 11 depicts the determination of color information in accordance with an embodiment of the present invention.

The present invention undersamples color information because the majority of pixels 124 receive full spectrum light. FIG. 11 is a schematic representation of how color is assigned to areas of the image 120 that coincide with areas of the image sensor 116 comprising pixels 124 that receive full spectrum light (i.e. panchromatic pixels 710 that do not receive color filtered light). In order to suppress visible artifacts that result from the invention's undersampling of color, the sparsely-sampled color signals that are received should be filtered or smoothed along both the vertical and horizontal axes of the image sensor 116. Filtering can be realized by convoluting the color channel signals with a suitable kernel. A less computationally intense approach is to provide a form of linear interpolation of the color signals. Another approach is to perform averaging of the color information obtained from the groups of pixels 708 across the detected image. In doing so, advantage can be taken of the relatively low resolution color, compared to the limiting resolution of the entire system; in that color information can be delayed without major degradation due to image motion smear. That is, if image motion is great enough that a frame delay of the color or chrominance information is significantly impacted; the luminance signal would be degraded to the point of questionable usefulness.

One implementation of a linear interpolation approach is illustrated in FIG. 11. In FIG. 11, a single color channel and associated pixels 1104 are illustrated for purposes of clarity. The color samples are taken on a square grid having a pitch (P) equal to the dimensions of a subset of pixels 704. That is, the pitch as it relates to color information is equal to the distance between adjacent groups of color information pixels 708 (represented by single color information pixels 1104). The digitized central values for each group 708 are illustrated as A(i, j), A(i+p, j). For two adjacent groups 708 in the horizontal direction, and A(i, j), A(i, j+p) in the vertical direction. In a progressive scan device, as the image is being read from the image sensor 116, the color value for columns of pixels 124 located between the groups of pixels 708 providing the central color values are estimated by suitable algorithm. For example, the color value for pixels located in columns between A(i, j) and A(i, j+p) can be estimated by:

$$A(i, j) = |_{n=j+(p-1)}^{n=j+1} [A(i, j) + (n x \delta_j)]$$

where $$\delta_j = \frac{A(i, j+p) - A(i, j)}{p}$$

Accordingly, the column values between A(i, j) and A(i, j+p) are calculated using the algorithm. Likewise, the column values between A(i+p, j) and A(i+p, j+p) are also determined using the above algorithm.

As the next frame is read, all of the color values between columns containing pixels providing color information are estimated by a similar algorithm. That is, the values between A(i+1, j) and A(i+(p−1), j) where the index for i ranges from 1 to p−1, thus denoting any line value between A(i+1, j) and A(i+1, j+(p−1)). As these row color values are interpolated, the column values of the current frame being read are also calculated. In general, interpolation is carried out for each color channel in parallel and used as the smoothed or filtered chrominance signal. The edge values for the outside blocks use the nearest neighbor computed or digitized central value as appropriate. The color values of the pixels 124 that do not receive filtered light are used to provide the high resolution luminance signal. The luminance signal values for the locations occupied by the color sensing pixels 708 (i.e. the pixels receiving filtered light) can be interpolated from neighbor luminance values.

As an example of the improved sensitivity of a color imaging device 100 in accordance with the present invention, as compared to a conventional color imaging device, consider an image sensor 116 comprising 1000 rows of pixels and 1000 columns of pixels. Furthermore, assume that 100 independent color samples are taken in both the horizontal and vertical axes. For purposes of the present example, a Bayer filter type group of pixels 708 may be used for obtaining color information. Accordingly, there will be a total of 100×100=10,000 pixels receiving color information. If those pixels receiving color information are considered to provide no contribution to the luminescence signal provided by the image sensor 116, only four percent of the total photon capture area provided by the image sensor 116 has been lost. Accordingly, the sensitivity of an image sensor 116 in accordance with the present invention is comparable to the sensitivity of a monochromatic image sensor. However, the present invention provides color information. In addition, an image sensor in accordance with the present invention is capable of providing luminance information from light that extends into infrared wavelengths, again providing increased sensitivity as compared to conventional color imaging systems. Furthermore, by obtaining color information from the groups of color sensing pixels, and using the remaining pixels as sources of luminance information, an imaging device 100 in accordance with the present invention provides the correct hue, although color saturation will often be inaccurate.

In accordance with an embodiment of the present invention, luminance signal values are provided with respect to pixels 124 sensitive to selected spectral bands or colors from neighboring pixels. For example, a luminance signal for a pixel 124 receiving filtered light may be interpolated from one or more adjacent pixels that receive unfiltered light. For instance, in connection with the pixel subset 704 arrangement shown in FIG. 7C, the luminance value for each color information pixel may be derived from the luminance values for the pixels 124 on the left and right using the equation ($L_{left}$+$L_{right}$)/2, where L is the luminance value. As a further example, the luminance value for the pixel 124 preceding a color information pixel 124 can simply be repeated using a sample and hold circuit.

Figure 12:
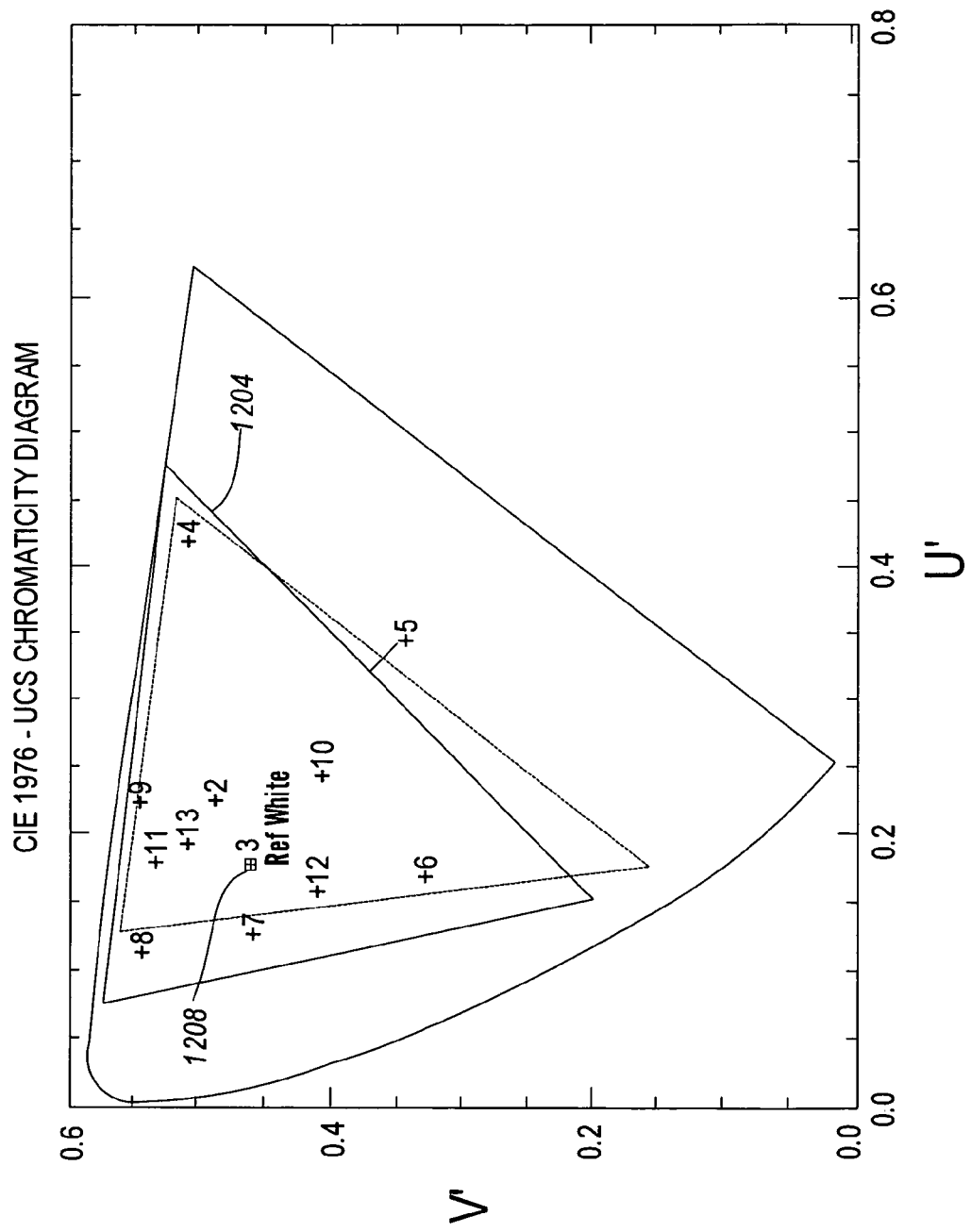
FIG. 12 is a chromaticity diagram of an ideal color imaging device.

In FIG. 12, a chromaticity diagram for an ideal color imaging system is illustrated. The display of the ideal system is set as if the scene illumination was that of a black body having a color temperature of 6500 Kelvin. The displaying primaries are as defined in specification Rec. 709 for HDTV. The gamut of colors that can be reproduced by the example ideal system fall within the triangle 1204. In FIG. 12, the hue and saturation of 13 test colors are shown by marks numbered 1-13. The output provided by this ideal system for each of the 13 test colors corresponds exactly with those test colors, with the exception of test sample no. 5, which is located outside of the range of colors that can be reproduced by the ideal system, given the reproducing primaries. Accordingly, the color of sample no. 5 is reproduced at the edge of the triangle, in line with reference white 1208, as shown by the vector emanating from the color's actual chromaticity coordinates, as delineated by the "+" next to reference no. 5. That is, the color is reproduced at the end of the vector. This is the best representation that the ideal system can provide for that color.

In the ideal system referred to with respect to FIG. 12, the spectral range of the test colors used in the simulation is from 400 nm to 1100 nm, covering both the visible and near infrared portions of the spectrum. The camera's Red-Green-Blue (RGB) taking characteristics cover only the visible portion of the spectrum, being nil for wavelengths longer than 780 nm. The luminance signal for the system is derived by summing the RGB signals in the proper proportions, as done in an NTSC TV broadcast signal.

Figure 13:
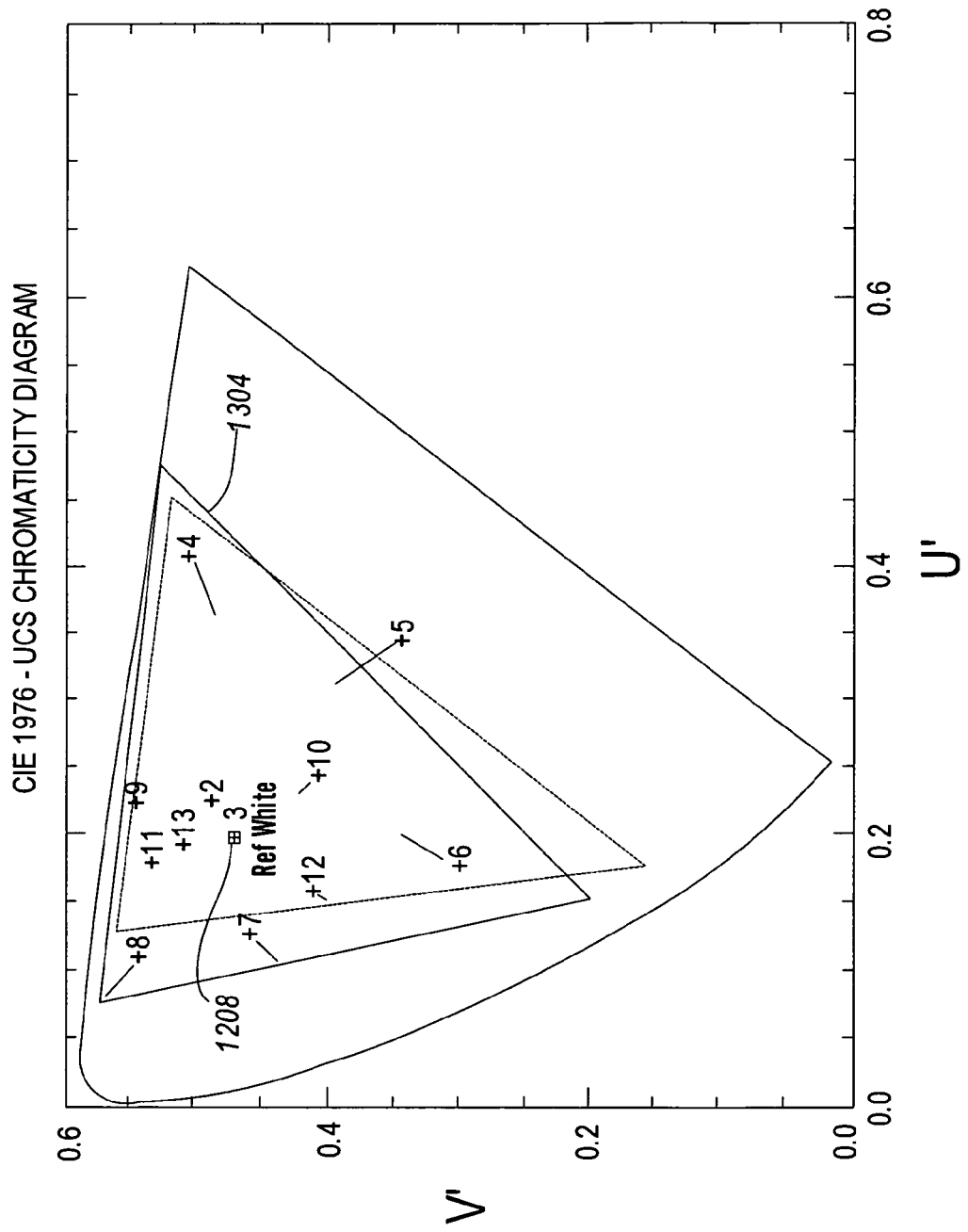
FIG. 13 is a chromaticity diagram for a color imaging device in accordance with an embodiment of the present invention.

In FIG. 13, the performance of an imaging system 100 in accordance with the present invention that provides a luminance signal generated with full spectrum (e.g. 400 nm to 1100 nm) sensitivity. For example, such responsivity can be obtained using a thinned, rear illuminated CCD with an epitaxial thickness of 14 microns that is provided with light that has not been color filtered. For purposes of the test results shown in FIG. 13, the gain of the chrominance signal is several times that of the luminance signal. The gamut of colors that can be reproduced by the imaging system 1100 fall within the triangle 1304. It will be noted that most of the test colors 1-13 are reproduced by the imaging system 100 in error. However, it will also be noted that the test colors are reproduced by the imaging system 100 with the correct hue. This is shown by the orientation of the vectors associated with each of the test colors; the vectors are in line with reference white 1208. The errors generally occur with respect to the saturation of the test colors. Nonetheless, by providing the correct hue, an imaging system 100 in accordance with the present invention is capable of providing color information sufficient to aid in the task of object recognition, while providing good low light level performance (i.e. high sensitivity). Furthermore, the provision of color information is obtained, even while providing pixels operating at full spectral bandwidth (i.e. including infrared portions of the spectrum) to provide even higher sensitivity.

Figure 14:
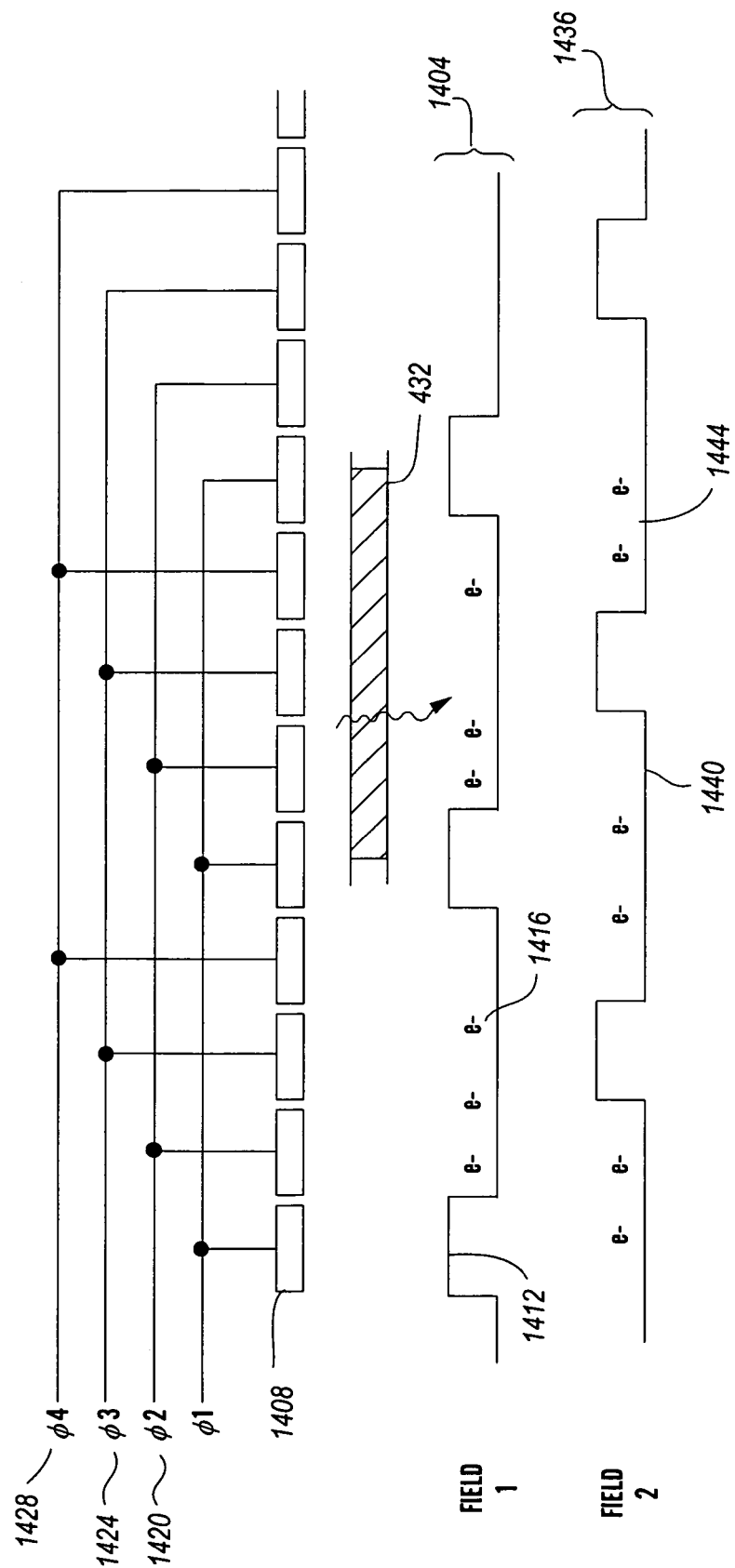
FIG. 14 depicts aspects of an interlaced imaging device sensor in accordance with an embodiment of the present invention.

FIG. 14 depicts aspects of an interlaced imaging device 100 in accordance with an embodiment of the present invention. In such a device, the center of collected information is shifted between the first and second fields comprising a frame of image data. Because of the shift in the center of the signal collection site, the requirements for the placement of the color microfilters needed in connection with pixels providing color information is potentially problematic.

In FIG. 14, one solution for providing color information in connection with an embodiment of the present invention utilizing a pseudo-interlaced system is illustrated. In FIG. 14, a four phase device is used for illustration purposes. Field 1 1404 uses phase 1 1408 as the barrier phase 1412 for the signal 1416 that is collected by phases 2 1420, 3 1424 and 4 1428. The color microfilter 432 is centered on the field 1 1404 collection site in the vertical axis. Above and below the microfilter 432, there is no spectral filter, and therefore the full spectrum falls on the other pixels. In field 2 1436, the placement of the microfilter 432 results in two collection sites 1440 and 1444 that do not receive full spectrum information. Accordingly, collection sites 1440 and 1444 are discarded from the signal provided in connection with field 2 1436, and color samples are only taken with respect to field 1 1404.

Figure 15:
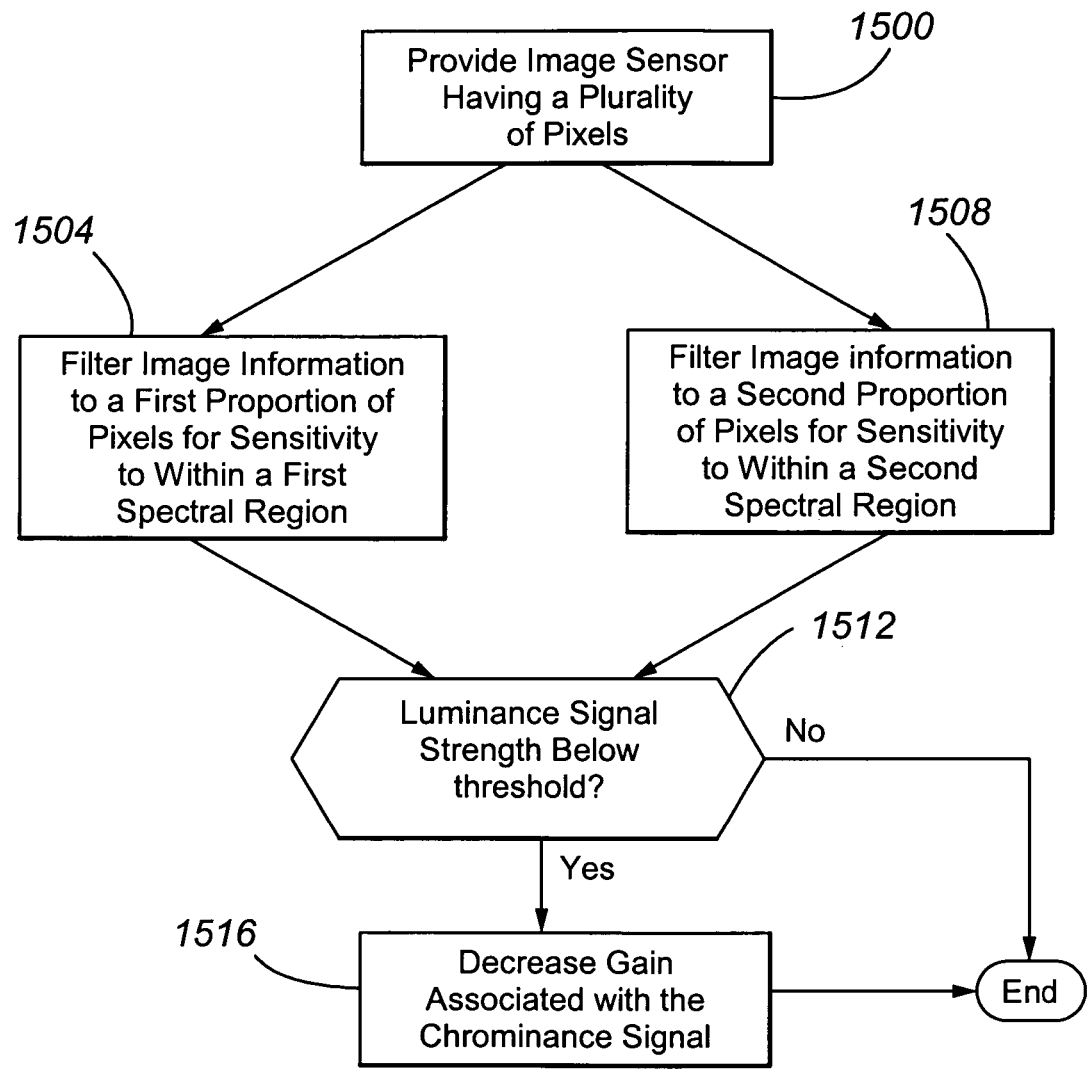
FIG. 15 is a flow diagram depicting aspects of a method for providing a low light level camera in accordance with embodiments of the present invention.

With reference now to FIG. 15, aspects of the operation of embodiments of the present invention in adjusting a gain amount are illustrated. Initially, at step 1500, an image sensor having a plurality of pixels is provided. The image information is filtered to a first proportion of the pixels, such that the first proportion of pixels is sensitive to a first spectral region (step 1504). At step 1508, image information to a second proportion of pixels is filtered for sensitivity to a second spectral region. As can be appreciated by one of skill in the art, steps 1504 and 1508 can be performed simultaneously. At step 1512, a determination is made as to whether a luminance signal strength or amplitude is below a predetermined threshold. If the luminance signal strength is below the predetermined threshold, the gain associated with the chrominance signal is decreased (step 1516). After the gain has been decreased, or after a determination that a signal to noise ratio of the chrominance signal from the filtered image information has not decreased, the process may end.

Figure 16:
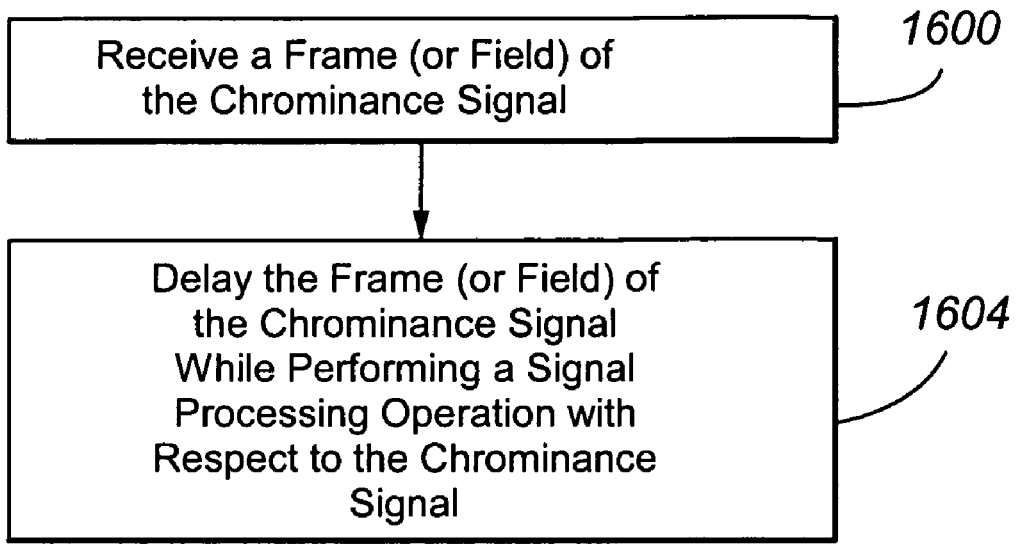
FIG. 16 is a flow diagram depicting aspects of a method for providing a low light level camera in accordance with embodiments of the present invention.

With reference now to FIG. 16, aspects of the operation of embodiments of the present invention in connection with the possible operating mode of delaying color information for processing are illustrated. Initially, at step 1600, a frame (or field) of the chrominance or color information signal is received. At step 1604, the frame (or field) of the chrominance signal is delayed while a signal processing operation with respect to the chrominance signal is performed.

Figure 17:
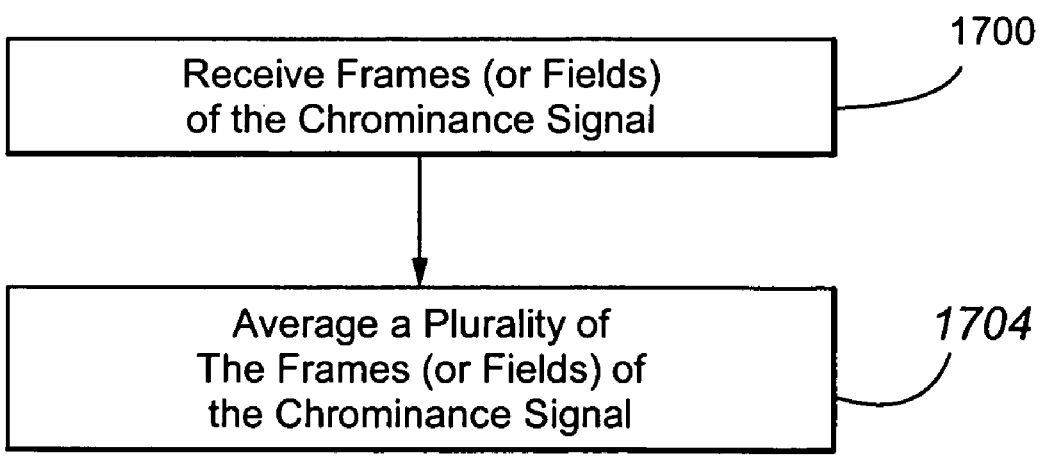
FIG. 17 is a flow diagram depicting aspects of a method for providing a low light level camera in accordance with embodiments of the present invention.

With reference now to FIG. 17, aspects of the operation of embodiments of the present invention in averaging chrominance information are illustrated. Initially, at step 1700, frames (or fields) or the chrominance signal are received. At step 1704, the plurality of frames or fields of the chrominance signal are averaged.

Figure 18:
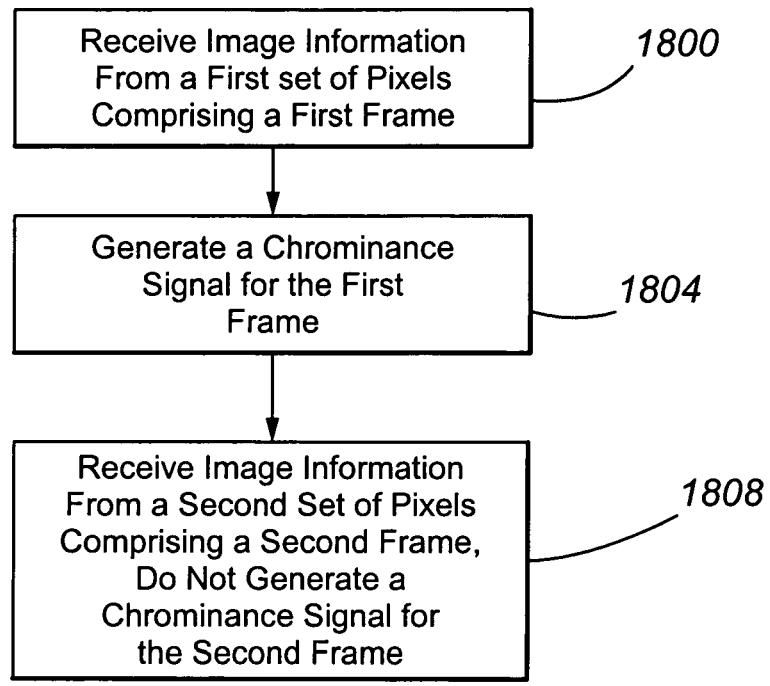
FIG. 18 is a flow diagram depicting aspects of a method for providing a low light level camera in accordance with embodiments of the present invention.

With reference now to FIG. 18, aspects of the operation of embodiments of the present invention in which color samples are only taken with respect to some fields or frames of information are depicted. Initially, at step 1800, image information from a first set of pixels comprising a first frame (or field) is received. At step 1804, a chrominance signal for the first frame is generated. At step 1808, image information from a second set of pixels comprising a second frame is received, but a chrominance signal for the second frame is not generated.

Figure 19:
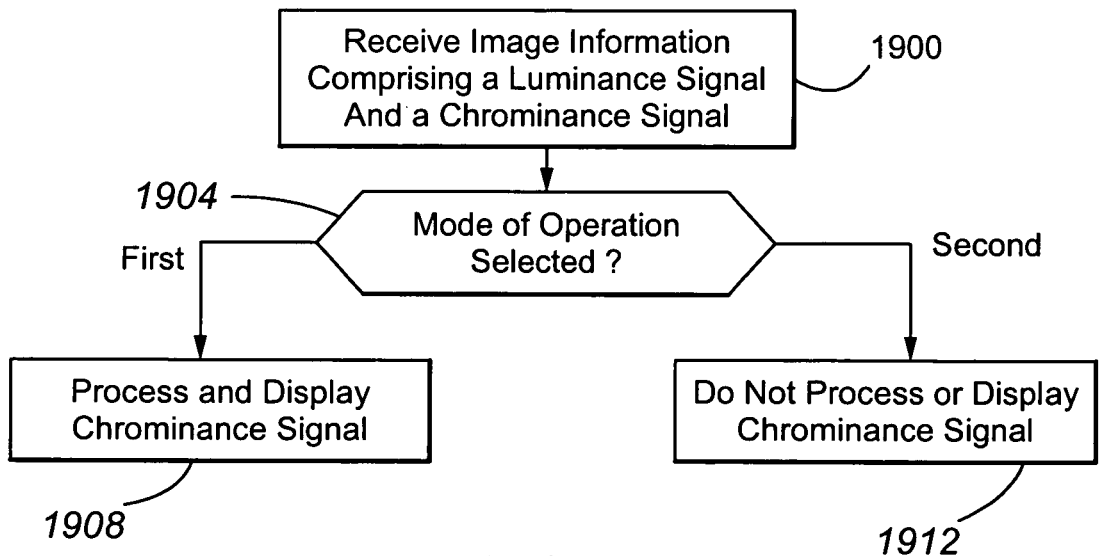
FIG. 19 is a flow diagram depicting aspects of a method for providing a low light level camera in accordance with embodiments of the present invention.

With reference now to FIG. 19, aspects of the operation of embodiments of the present invention in connection with enabling different modes of operation are illustrated. Initially, at step 1900, image information comprising a luminance signal and a chrominance signal is received. At step 1904, a determination is made as to the particular mode of operation that is selected. If a first or color enabled mode of operation is selected, a chrominance signal is processed and displayed (step 1908). Accordingly, in the first mode of operation, both a luminance signal and a chrominance signal are used to create a displayed image. If at step 1904, it is determined that a second mode of operation has been selected, a chrominance signal is not processed or displayed (step 1912). Accordingly, in a second mode of operation only luminance information is used to create a displayed image.

Figure 20:
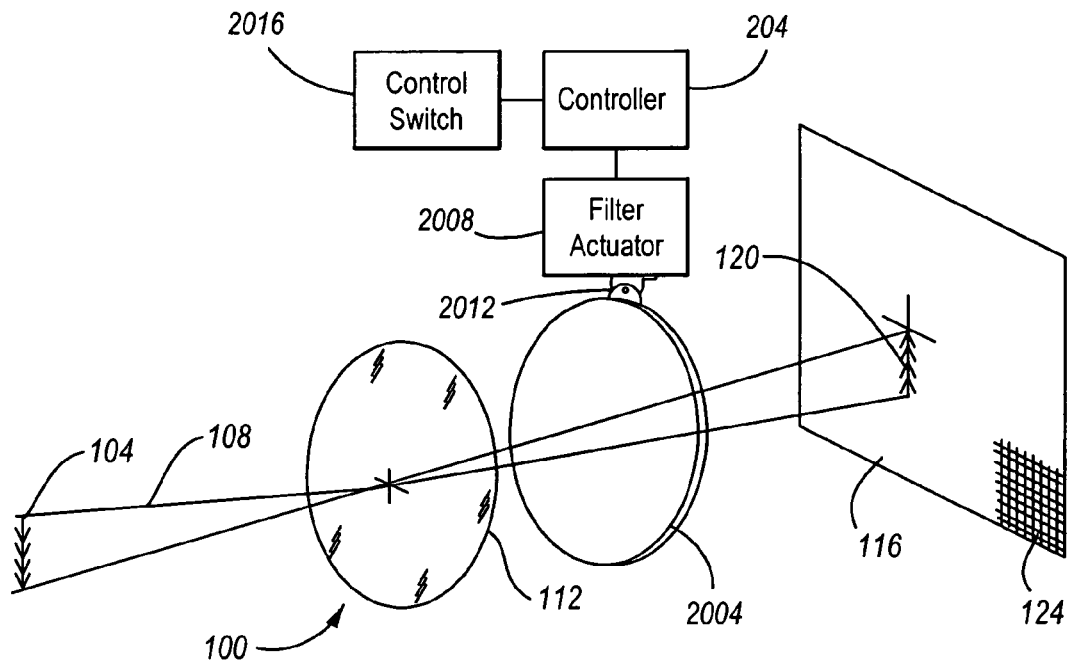
FIG. 20 illustrates an electronic imaging device configuration in accordance with other embodiments of the present invention.

In FIG. 20, an electronic imaging device 100 configuration in accordance with other embodiments of the present invention is illustrated. In particular, FIG. 20 illustrates an imaging device 100 configuration similar to the configuration illustrated in FIG. 1, with the addition of a near infrared blocking filter 2004. In accordance with the embodiments of the present invention, the near infrared blocking filter 2004 prevents wavelengths in the near infrared band from reaching the pixels 124 of the image sensor 116. As can be appreciated by one of skill in the art, the provision of a near infrared blocking filter 2004 to filter light 108 incident on the image sensor 116 facilitates improved color performance, because signals from color information pixels 706 receiving light filtered to within selected spectral bands in order to provide color information using conventional organic dyes or other filter techniques, remain somewhat sensitive to near infrared wave lengths. Accordingly, by providing a near infrared blocking filter 204, truer color information can be obtained. In accordance with further embodiments of the present invention, the near infrared blocking filter 2004 is "global", in that it blocks near infrared light from reaching any of the pixels 124 included in the image sensor 116. In accordance with embodiments of the present invention, the near infrared blocking 2004 blocks light having a wavelength of greater than about 740 nm. In accordance with further embodiments of the present invention, the near infrared blocking filter blocks light having wavelengths between about 740 nm and about 1100 nm.

In accordance with further embodiments of the present invention, the near infrared blocking filter 2004 can be selectively removed from the optical path of the imaging device 100. Removal of the infrared blocking filter 2004 from the optical path may be performed by a filter actuator 2008 through a mechanical linkage 2012 that together operate to swing the near infrared blocking filter 2004 out of the optical path. The filter actuator 2008 may be controlled by the controller 204. More particularly, the controller 204 may signal the filter actuator 2008 to either position the infrared blocking filter 2004 in the optical path or remove the infrared blocking filter 2004 from the optical path. The control signal from the controller 204 to the filter actuator 2008 may be generated in response to a user selection provided through a control switch 2016 interconnected to the controller 204. Alternatively, a control switch 2016 directly connected to the filter actuator 2008 may allow a user to select whether or not the infrared blocking filter 2004 is placed in the optical path of the device 100. In accordance with further embodiments of the present invention, the controller 204 may control the filter actuator 2008 in response to detected ambient light levels. For instance, in very dark (e.g. overcast and moonless conditions) the near infrared blocking filter 2004 may be removed from the optical path, so that the pixels 124 included in the image sensor 116 can provide increased sensitivity. As a further example, in bright conditions (e.g. in moonlight to daylight) the controller 204 may operate the filter actuator 2008 to place the near infrared blocking filter 2004 in the optical path of the device 100, to provide improved color sensing performance. In accordance with still other embodiments of the present invention, a user may manipulate the near infrared blocking filter 2004 directly or through a mechanical linkage 2012, to place the near infrared blocking filter 2004 in the desired position.

As can be appreciated as one of skill in the art, the provision of the near infrared blocking filter 2004 can provide improved color sensing performance. In particular, the pixels 124 of the image sensor 116 are typically at least somewhat sensitive to near infrared light. However, such sensitivity is undesirable in connection with the pixels that are used to provide color information, because light in the near infrared region sensed by color information pixels will be erroneously treated as color information. It can also be appreciated that, because the panchromatic pixels are sensitive to visible light, as well as near infrared light, the panchromatic pixels continue to provide luminance information while the near infrared blocking filter 2004 is position in the optical path of the imaging device 100. Therefore, the imaging device 100 can provide higher resolution image information than otherwise comparable devices in which all or a larger portion of the image sensor pixels are capable of providing color information. Furthermore, it can be appreciated that by providing a near infrared blocking filter 2004 that can be selectively removed from the optical path the sensitivity of the panchromatic pixels in the near infrared region can be used to obtain greater sensitivity in low light conditions.

In accordance with the embodiments of the present invention, signals from pixels normally used to provide color information can be switched off or discarded during low light operation. For example, in low light conditions turning off or removing signals from color sensitive pixels can reduce noise in the output signal of the device 100. Whether output from color sensitive pixels is used to form an image output by the device 100 can be controlled in response to the control switch 2016 and or the controller 204.

Figure 21:
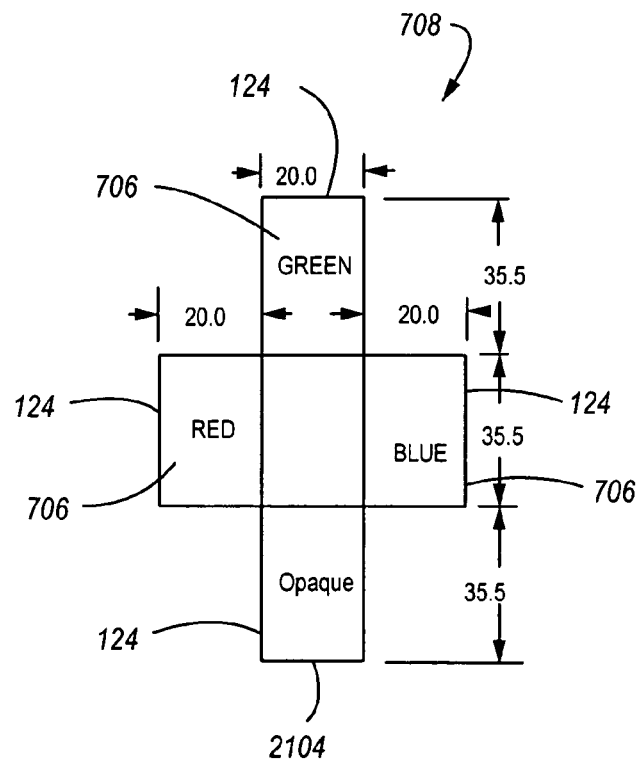
FIG. 21 illustrates a color information group incorporating an opaque pixel in accordance with embodiments of the present invention.

With reference to FIG. 21, a color information group 708 in accordance with other embodiments of the present invention as illustrated. In particular, the color information group 708 in such embodiments incorporates an opaque pixel 2104. The opaque pixel 2104 may comprise a pixel 124 of the image sensor 116 that is associated with a filter that is effectively opaque to both the visible and near infrared regions of the spectrum. In accordance with the embodiments of the present invention, the light attenuation of the filter associated with the opaque pixel 2104 is 80 times or greater. As shown in FIG. 21, the opaque pixel 2104 is associated with pixels 124 that provide color information. For example, as shown in FIG. 21, an opaque pixel 2104 may be associated with one each of a green, red and blue sensing pixel 706. However, it should be appreciated that other configurations are possible.

The signal accumulated under the opaque pixel 2104 will consist of two components: charge diffusion and dark current. The signal from the opaque pixel 2104 can be subtracted from the color sample signals of the associated color information group 708 to mitigate the error component caused by charge diffusion.

As can be appreciated by one of skill in the art, dark current is an error component with its attendant random noise caused by the thermal generation of electrons in an image sensor. This thermally-generated component, as with the charge diffusion component, can be subtracted from the color samples. One skilled in the art is aware that dark current is often assessed by light-shielded pixels along an edge. However, charge diffusion amplitude is a function of local image brightness and therefore must be locally assessed. Furthermore, color samples will typically be of lower amplitude than that of the panchromatic pixel amplitudes due to their small spectral range. This exacerbates the impact of charge diffusion on color sample signals. Dark current can be mitigated by cooling the image sensor or as mentioned can be sensed by light-shielded pixels outside the active image area and subtracted from the signal or signals. Since dark current is not a function of scene content, a frame-to-frame running average of dark current can be implemented with the advantage of reducing randomness or noise by averaging over a large number of samples. The opaque pixel will contain both charge diffusion and dark current components. The final charge diffusion correction must consider this by adding back in any average dark current amount that has been subtracted.

Charge diffusion results from the incomplete collection of signals within the borders of a pixel 124. In particular, within the active area of a pixel 124 of a charge coupled device (CCD) type image sensor 116, there is a charge collection well and a free field region. If a photon is absorbed within the collection potential well, it is essentially trapped there and no diffusion results. Instead, the photon influences the signal of the pixel that includes the potential well in which the photon landed. However, if a photon is absorbed in the free field region of a pixel 124, then a resulting signal charge can find its way to a neighboring collection well by a random walk. Accordingly, the charge can become associated with the collection well of the pixel associated with the free field region in which the photon landed, or with the collection well of a neighboring pixel. When the photon becomes associated with a neighboring pixel, the signal from the image sensor 116 is geometrically blurred. By subtracting the signal obtained by the opaque pixels from the color information signals, the effect of charge diffusion can be mitigated.

Figure 22:
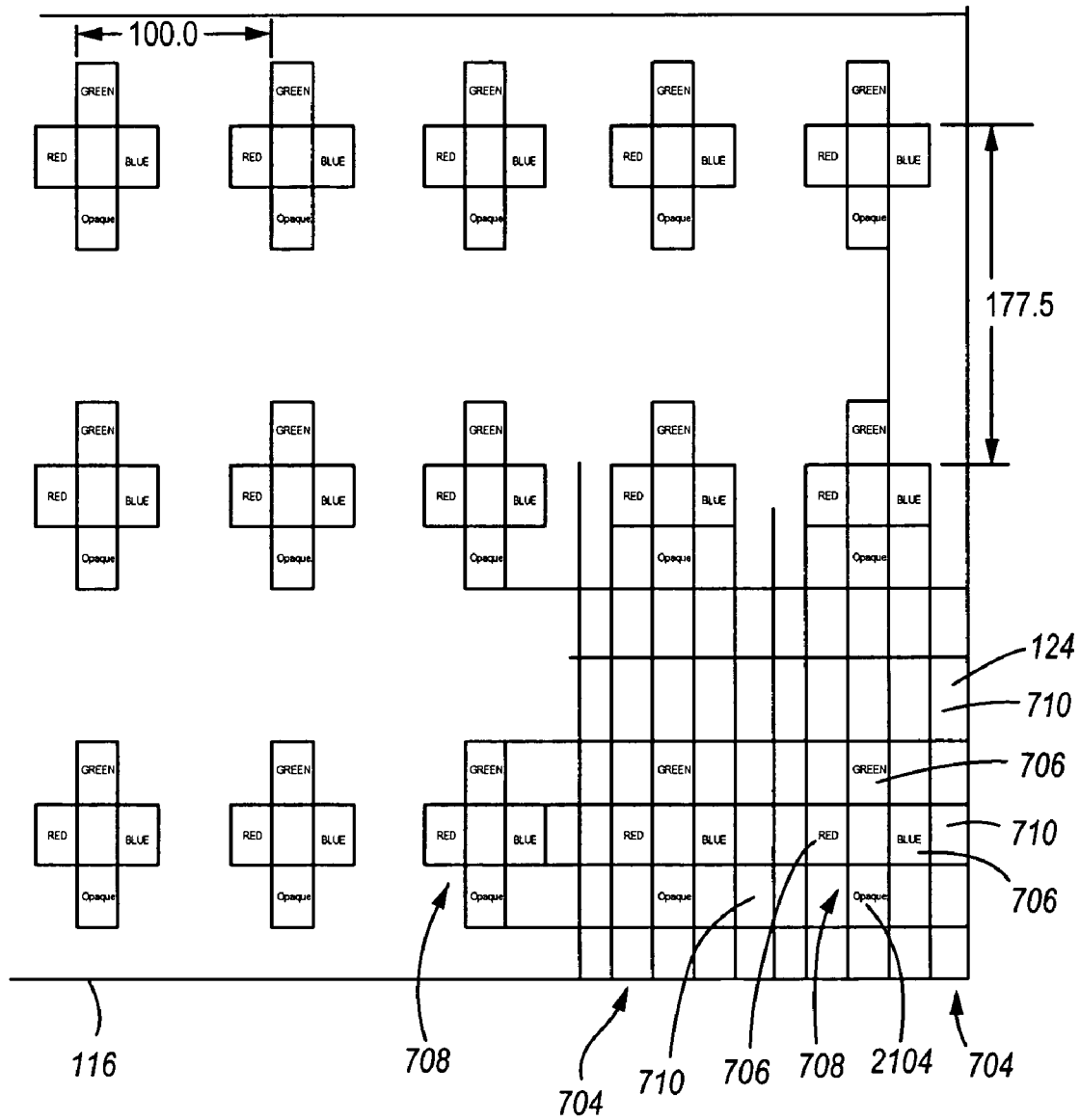
FIG. 22 depicts an image sensor in accordance with other embodiments of the present invention.

In FIG. 22, a portion of an image sensor 116 in accordance with embodiments of the present invention as illustrated. In particular, the portion of the image sensor 116 includes a number of color groups 708 incorporating an opaque pixel 2104. Furthermore, the example of FIG. 22 illustrates an arrangement in which each color information group 708 is associated with a block or group 704 of pixels 124 including 25 total pixels, and 21 panchromatic pixels, in addition to the four pixels included in each group 708 for color information and signal processing information. However, embodiments of the present invention are not necessarily limited to any one particular arrangement or distribution of groups of color information and signal processing information pixels 708 and panchromatic pixels 710. Other examples include groups 708 that include three pixels 706 that are provided with filtered information to provide color information and one opaque pixel 2104 to provide signal processing information for each block 704 of 64 pixels 124 total in an 8×8 configuration, or for each block 704 of 144 pixels 124 total in a 12×12 configuration.

Figure 23:
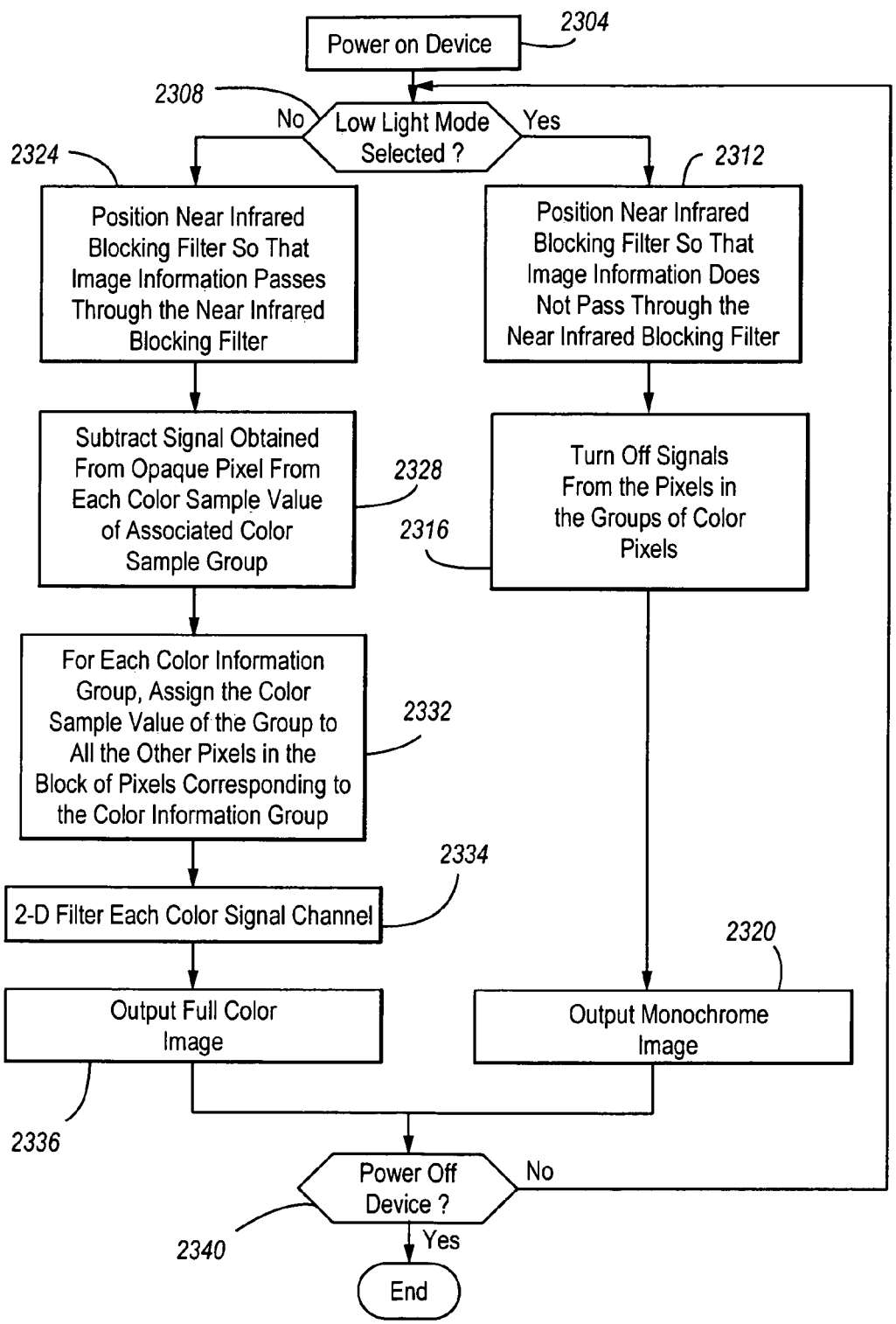
FIG. 23 is a flow diagram depicting aspects of the operation of a camera in accordance with embodiments of the present invention.

In FIG. 23, aspects of the operation of a camera or electronic imaging device 100 in accordance with embodiments of the present invention are depicted. Initially, at step 2304, the electronic imaging device 100 is powered on. A determination may then be made as to whether a low light mode has been selected (step 2308). The selection of a low light mode may be made in response to a user input, for example provided to the controller 204 through a control switch 2016 or other user input facility. Alternatively or in addition, a low light mode may be selected automatically, for example in response to the detection of illumination levels in a scene of less than a selected or predetermined threshold amount.

If it is determined that a low light mode has been selected, the near infrared blocking filter 2004 is positioned so that image information 108 collected by the lens or lens system 112 does not pass through the near infrared blocking filter 2004 (step 2312). That is, the near infrared blocking filter 2004 is removed from the image information 108 optical path (see FIG. 20). Removing the near infrared blocking filter 2004 from the optical path may comprise the controller 204 operating the filter actuator 2008 to move the near infrared blocking filter 2004 out of the optical path via the mechanical linkage 2012. Alternatively, removing the near infrared blocking filter 2004 may comprise a user manually moving the near infrared blocking filter 2004 out of the optical path, either directly or via the mechanical linkage 2012. As can be appreciated by one of skill in the art, by removing the near infrared blocking filter 2004 from the optical path, light through at least the near infrared wavelengths is allowed to reach the image sensor 116, allowing the sensitivity of the panchromatic pixels 710 to near infrared wavelengths to be exploited in collecting image information related to the images scene, and increasing the overall sensitivity of the electronic imaging device 100.

In addition to moving the near infrared blocking filter 2004 out of the optical path, in the low light mode, signals from the pixels included in the groups of color information pixels 706 and opaque pixels 2104 may be switched off (step 2316). Switching or turning off the information from the groups 708 of color information and signal processing pixels may comprise disconnecting or discarding inputs from pixels included in the groups 708 of color information and signal processing pixels. Switching off this information can reduce noise in the output of the device 100, particularly in low light conditions. A monochrome image is then output (step 2320). As can be appreciated by one of skill in the art, examples of outputting an image may comprise displaying the collected image information to a user through a display device in realtime or essentially realtime (i.e. immediately following any processing delays), and/or recording the collected image information for later viewing or analysis. In accordance with other embodiments of the present invention, a mode may be enabled in which the near infrared blocking filter 2004 is switched out of the optical path, but signals from the color and signal processing pixel groups 708 are used to create the output, for example in partial low light conditions, allowing for an output with color information to be provided.

If it is determined that the low light mode has not been selected, the near infrared blocking filter 2004 is positioned so that collected light 108 is passed through the near infrared blocking filter 2004, to remove light in the near infrared wavelengths (step 2324). For example, light with wavelengths from at least about 740 nm to about 1100 nm may be filtered out of the collected light 108. Positioning of the near infrared blocking filter 2004 may be performed in response to a user input or another input to the controller 204, which may then operate the filter actuator 2008 to place the near infrared blocking filter 2004 in the optical path via the mechanical linkage 2012. Alternatively or in addition, provision may be made to allow a user to manually position the near infrared blocking filter 2004 in the optical path. As can be appreciated by one of skill in the art, removing the near infrared wavelengths from the collected light 108 can improve the color performance of the electronic imaging device 100, because the signals from the color information pixels 706 are then less influenced by light outside of the spectral region that each color information pixel 706 is intended to discriminate. As can also be appreciated by one of skill in the art, although the use of the near infrared blocking filter 2004 results in the available sensitivity of the panchromatic pixels 710 to near infrared wavelengths not being used, the panchromatic pixels 710 remain effective at providing luminance information based on collected light 108 in the visible wavelengths. Accordingly, because of the large proportion of panchromatic pixels 710 included in the image sensor 116, a relatively high definition image can obtain by the sensor 116.

At steps 2328-2332, signal processing is performed on the collected image information. In particular, at step 2328, a signal from an opaque pixel 2104 in each group 708 of color pixels is subtracted from each color sample value provided by the associated color pixels 708. As can be appreciated by one of skill in the art, the signal from an opaque pixel 2104 is representative of an error signal in the image sensor 116 at the location of the opaque pixel 2104. This error signal is generally the result of charge diffusion (which is a particular problem in well illuminated scenes are imaged and a large number of photons are incident on the image sensor 116) and dark current. Accordingly, by subtracting the signal provided by an opaque pixel 2104 from the signals of the color information pixels 706 grouped with that opaque pixel 2104, chrominance errors in the output signal are reduced. As will be recognized by one skilled in the art, dark current can be assessed by light-shielded pixels along the edge or edges of the imaging device. However, charge diffusion is proportional to local area image brightness and therefore must be determined locally, at the color information group 708 level.

At step 2332 the color information collected by each color information group 708 is assigned to the area of the image corresponding to each n×n pixel 124 group or block 704 associated with or corresponding to a color information group 708. In accordance with embodiments of the present invention, two-dimensional filtering or averaging of the collected color information is then performed across the entire image area (step 2334). For example, each color signal channel can be averaged, or the color signal channels can be expressed as two signals from each color information group and averaged. Furthermore, such filtering or averaging can be performed after signal encoding, if any. Also, filtering can incorporate a time constant that is greater than a block 704, so that color is applied smoothly with gradation. As alternatives to averaging collected color information, other techniques for assigning collected color information to areas of the image corresponding to areas of the image sensor 116 comprising panchromatic pixels 710 include convolution and interpolation techniques. In general, it is desirable to provide suitable processing power and/or select a signal processing technique or algorithm that can be performed quickly, to minimize latency, particularly where the image information is needed on a realtime or near realtime basis.

A full color image is output at step 2336. As in the case of a monochromatic image, outputting the image may comprise displaying the collected image information to a user in realtime (or essentially realtime) and/or recording the image information for later viewing or analysis.

After outputting an image at step 2320 or step 2336, a determination may be made as to whether the electronic imaging device 100 has been powered off (step 2340). If the device 100 has not been powered off, the process may return to step 2308, to again determine if a low light mode has been selected. Accordingly, it can be appreciated that the steps illustrated in FIG. 23 may be performed substantially continuously while the electronic imaging device 100 is in use. If it is determined that the device 100 has been powered off, the process may end.

In accordance with an embodiment of the present invention, the amount of chrominance signal gain can be adjusted according to the light levels available in a scene. For example, at very low light levels, the chrominance signal gain can be reduced to reduce noise. The variation in signal gain can be implemented in connection with an automatic gain control (AGC) circuit.

In addition, the relatively low resolution chrominance signal, as compared to the luminance signal, provided by the present invention, allows a frame delay with respect to color channel information, with little or no deterioration in the provided image. The implementation of a frame delay can provide additional time for signal processing and for spatial filtering of the chrominance signal. The chrominance signals may also be averaged over a number of frames to improve the signal to noise ratio of the color information.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for controlling characteristics of a camera, comprising:
   providing an image sensor comprising a plurality of pixels;
   filtering image information to a first portion of the plurality of pixels for sensitivity to a selected first spectral region;
   filtering image information to a second portion of the plurality of pixels for sensitivity to a selected second spectral region;
   filtering image information to a third portion of the plurality of pixels for sensitivity to a selected third spectral region, wherein less than half of the pixels of the image sensor pixels receive image information filtered to within one of the first, second, or third spectral regions, wherein image information incident on a fourth portion of the plurality of pixels is not filtered to within any one of said first, second, or third spectral regions, and wherein the fourth portion of the plurality of pixels comprises more than half of the plurality of pixels of the image sensor; and
   at least one of:
   1) filtering image information incident on the plurality of pixels of the image sensor to remove at least near infrared wavelengths from the image information;
   2) filtering image information to a fifth portion of the plurality of image sensor pixels, wherein at least visible and near infrared wavelengths are blocked from reaching the fifth portion of pixels.

2. The method of claim 1, wherein the fourth portion of the plurality of pixels of the image sensor are sensitive to at least near infrared wavelengths.

3. The method of claim 2, wherein image information incident on the plurality of pixels of the image sensor is filtered to remove at least near infrared wavelengths from the image information.

4. The method of claim 2, further comprising:
   selecting a high visible ambient light mode, wherein in response to selecting the high visible ambient light mode the image information incident on the plurality of pixels of the image sensor is filtered to remove at least near infrared wavelengths from the image information.

5. The method of claim 4, wherein said selecting a high visible ambient light mode comprises placing a filter for removing at least near infrared wavelengths in a path of an optical beam comprising the image information incident on the pixels of the image sensor.

6. The method of claim 5, further comprising:
   selecting a low visible ambient light mode, wherein the filter for removing at least near infrared wavelengths is taken out of the path of the optical beam comprising the image information incident on the pixels of the image sensor.

7. The method of claim 6, further comprising:
   in response to selecting the low visible ambient light mode, removing a signal from the first, second and third portions of pixels from an output of said image sensor.

8. The method of claim 7, wherein the first, second and third portions of pixels of the image sensor comprise color information pixels.

9. The method of claim 1, wherein image information to a fifth portion of the pixels of the image sensor is filtered, wherein at least visible and near infrared wavelengths are blocked from reaching the fifth portion of pixels.

10. The method of claim 9, further comprising:
    using a signal from said fifth portion of pixels to reduce effects of at least one of charge diffusion and dark current.

11. The method of claim 10, wherein said using a signal from the fifth portion of pixels comprises subtracting signals provided by the pixels in the fifth portion of pixels from signals provided by pixels included in the first, second and third portions of pixels.

12. The method of claim 11, wherein each pixel included in the fifth portion of pixels is associated with a group of pixels comprising at least one of each of the first, second and third portions of pixels, wherein for each group a signal from the pixel in the fifth portion of pixels is subtracted from a signal from each of the other pixels in the group.

13. The method of claim 1, further comprising:
    1) filtering image information incident on the plurality of pixels of the image sensor to remove at least near infrared wavelengths from the image information; and
    2) filtering image information to a fifth portion of the plurality of image sensor pixels, wherein at least visible and near infrared wavelengths are blocked from reaching the fifth portion of pixels.

14. A camera apparatus, comprising:
an image sensor, wherein said image sensor comprises:
   a first plurality of pixels, wherein the first plurality of pixels provides image information including a first range of visible wavelengths;
   a second plurality of pixels, wherein the second plurality of pixels provides image information including a second range of visible wavelengths;
   a third plurality of pixels, wherein the third plurality of pixels provides image information including a third range of visible wavelengths; and
   a fourth plurality of pixels, wherein the fourth plurality of pixels is capable of providing image information including near infrared wavelengths, wherein a number of pixels included in the fourth plurality of pixels is greater than a number of pixels included in the first, second and third pluralities of pixels combined.

15. The apparatus of claim 14, further comprising:
a near infrared blocking filter, wherein in a first mode of operation the near infrared blocking filter is placed in a path of a beam comprising image information incident on the image sensor to prevent near infrared wavelengths from reaching the first, second, third or fourth plurality of pixels, and wherein in a second mode of operation the near infrared blocking filter is removed from the beam comprising image information incident on the image sensor to permit near infrared wavelengths from reaching the first, second, third and fourth plurality of pixels.

16. The apparatus of claim 15, further comprising:
a processor, wherein an image sensor output signal is processed to create a camera output signal.

17. The apparatus of claim 16, wherein in the second mode of operation an output from the first, second and third pluralities of pixels is removed from the camera output signal.

18. The apparatus of claim 16, wherein in the first mode of operation the processor assigns color information to areas of an image comprising the camera output signal corresponding to at least most of the image information by averaging the color information from nearby pixels included in one of the first, second or third pluralities of pixels.

19. The apparatus of claim 14, further comprising:
   a fifth plurality of pixels, wherein the fifth plurality of pixels is not provided with image information in visible or near infrared wavelengths; and
   a processor, wherein information comprising at least one of a charge diffusion signal and a dark current obtained from said fifth plurality of pixels is used by said processor to provide a filtered camera output signal.

20. The apparatus of claim 19, further comprising: a near infrared blocking filter, wherein in a first mode of operation the near infrared blocking filter is placed in a path of a beam comprising image information incident on the image sensor to prevent near infrared wavelengths from reaching the first, second, third or fourth plurality of pixels, and wherein in a second mode of operation the near infrared blocking filter is removed from the beam comprising image information incident on the image sensor to permit near infrared wavelengths from reaching the first, second, third and fourth plurality of pixels.

21. The apparatus of claim 19, wherein at least most of said first, second, third and fifth pluralities of pixels are arranged in groups consisting of one pixel from each of the first, second, third and fifth pluralities of pixels, wherein said groups of one pixel from each of the first, second, third and fifth pluralities of pixels are surrounded by pixels included in the fourth plurality of pixels.

22. The apparatus of claim 14, wherein at least 90 percent of a total number of pixels comprise pixels included in the fourth plurality of pixels.

23. The apparatus of claim 14, wherein each of the pixels included in the first plurality of pixels is associated with a filter that passes wavelengths included in the first range of visible wavelengths,
   wherein each of the pixels included in the second plurality of pixels is associated with a filter that passes wavelengths included in the second range of visible wavelengths,
   wherein each of the pixels included in the third plurality of pixels is associated with a filter that passes wavelengths included in the third range of visible wavelengths.

* * * * *